United States Patent
Hernandez Ferrusca et al.

(10) Patent No.: US 8,519,651 B2
(45) Date of Patent: Aug. 27, 2013

(54) DEPHASING CONTROL

(75) Inventors: Omar Antonio Hernandez Ferrusca, Santiago de Queretaro (MX); Alfredo Diaz Fernandez, Santiago de Queretaro (MX)

(73) Assignee: Mabe, S.A. DE C.V., Queretaro (MX)

( * ) Notice: Subject to any disclaimer, the term of this patent is extended or adjusted under 35 U.S.C. 154(b) by 141 days.

(21) Appl. No.: 13/270,321

(22) Filed: Oct. 11, 2011

(65) Prior Publication Data

US 2012/0086383 A1 Apr. 12, 2012

(30) Foreign Application Priority Data

Oct. 11, 2010 (MX) .................. MX/A/2010/011171

(51) Int. Cl.
*H02P 6/16* (2006.01)
*H02M 7/539* (2006.01)
*B04B 13/00* (2006.01)

(52) U.S. Cl.
USPC ........... 318/400.13; 363/71; 363/65; 363/124

(58) Field of Classification Search
USPC .............. 318/400.13–400.14; 363/65, 71, 363/124
See application file for complete search history.

(56) References Cited

U.S. PATENT DOCUMENTS

| | | | | |
|---|---|---|---|---|
| 3,568,022 A * | 3/1971 | Domann et al. | ............... | 318/800 |
| 3,688,171 A * | 8/1972 | Salihi et al. | .................. | 318/759 |
| 4,158,163 A * | 6/1979 | Eriksen et al. | ................ | 318/798 |
| 5,334,924 A * | 8/1994 | Kawada et al. | ............... | 318/811 |
| 5,734,250 A * | 3/1998 | Lindmark | ..................... | 318/801 |
| 6,060,851 A | 5/2000 | Imai et al. | | |
| 6,204,627 B1 * | 3/2001 | Watanabe et al. | ............. | 318/729 |
| 6,316,895 B1 | 11/2001 | Ramarathnam | | |
| 7,017,377 B2 | 3/2006 | Hosoito et al. | | |
| 7,330,011 B2 | 2/2008 | Ueda et al. | | |
| 7,911,170 B2 * | 3/2011 | Hauttmann et al. | .......... | 318/490 |
| 8,339,093 B2 * | 12/2012 | Lu et al. | ....................... | 318/807 |
| 2007/0063662 A1 * | 3/2007 | Yokozutsumi et al. | ....... | 318/139 |

FOREIGN PATENT DOCUMENTS

| | | |
|---|---|---|
| CN | 201118416 | 9/2008 |
| JP | 2206387 | 8/1990 |
| JP | 11252989 | 9/1999 |
| JP | 2001190887 | 7/2001 |
| JP | 2002291276 | 10/2002 |
| JP | 2003135883 | 5/2003 |
| JP | 2003265883 | 9/2003 |
| JP | 2005143808 | 6/2005 |
| JP | 2007175135 | 7/2007 |
| JP | 2008246106 | 10/2008 |

* cited by examiner

*Primary Examiner* — Eduardo Colon Santana
*Assistant Examiner* — Said Bouziane
(74) *Attorney, Agent, or Firm* — Enrique J. Mora; Beusse Wolter Sanks Mora & Maire, P.A.

(57) ABSTRACT

A system to control an asynchronous tri-phase motor may include a braking resistance coupled to receive output voltage from the voltage multiplier to dissipate energy when the system is in a braking mode. The system may further include a module to emit a pulse train (e.g., Pulse Width Modulation (PWM)) and having a frequency selectively determined by a microcontroller. The module may be operatively coupled to apply the pulse train to an H bridge circuit in the IGBT module, which is coupled to pass a conditioned line voltage to the tri-phase motor in response to the PWM pulse train applied to the H bridge circuit in the IGBT module.

9 Claims, 13 Drawing Sheets

General Algorithm Diagram for Slip Control

DEPHASING CONTROL

RELATED APPLICATIONS

This application claims priority from Mexican Application Serial No. MX/a/2010/011171 filed Oct. 11, 2010, which is incorporated herein by reference in its entirety.

FIELD OF INVENTION

The present invention lies in the field of electric motor control (induction) which can be used for diverse applications, both in industry in general as in household appliances in particular; showing in an illustrative manner but not limited to its application in washers.

BACKGROUND OF THE INVENTION

According to Irvin Gottlieb in his work titled "Electric Motors and Control Techniques", Second Edition Page 72 McGraw Hill 1994 U.S.A., the induction motor can be understood as a rotary transformer, this due to the effect present in large capacity or very large transformers where the design of these present special attention to the mechanic repulsion force which exists between the primary and secondary coils; thus this repulsion phenomenon between coils in some way gives life to the asynchronous squirrel cage motor; the "primary" being the stator and the "secondary" in short circuit the rotor, this being an advantageous design compared to the synchronous machines (motors) as they do not require permanent magnets, "carbons", brushes or switches.

The squirrel cage motors, above all the tri phase motors of this kind, are fairly common for diverse industrial applications, due to their construction simplicity, robust design and efficiency among other virtues. Thus this type of motors is desirable for other applications, such as household washers or refrigerators, where in the example with the washer it has the inconvenience of the velocity control, since these motors work very well at a constant velocity, it being rather difficult to control the velocity of these. A first effort is described in the already referenced bibliography by Gottlieb in pages 91 and 92, where it explains a variation in an asynchronous squirrel cage motor where the coils of the rotor are landed or connected to some sliding rings, and these in turn, are connected to some rheostats. Upon doing this the rotor velocity can then be controlled by increasing or decreasing the resistance in the rheostats, as these can cause an increase or a decrease in the dephasing or slipping between the velocity of the magnetic field in the stator and the mechanical velocity of the rotor. This type of motor construction turns at a certain undesired point upon knowing that the sliding rings require brushes or carbons, themselves elements of wearing which also allow the flow of current; this in addition to increasing the cost and complexity of the motor construction, thereby increasing maintenance cost.

Another effort to control the velocity of a squirrel cage motor is found in US document 6316895 B1 by Ramarathnam, where the methodology of "Pulse Width Modulation" (PWM) is used where the quotient between the voltage and the frequency is maintained at a constant and through this, it is possible to maintain constant torque, allowing for velocity variation with lower voltages than the motor work voltage, with such luck that with the mere frequency variation the motor velocity is controlled. This document also explains an interesting variation of the PWMs, by using Spatial Vectors, thus the theory explained in the mentioned document, develops a logic named Space Vector Pulse Width Modulation ("SVPWM"). Thus using these techniques can successfully result in the programming of an electric control so that it may itself for certain periods of time can turn on and off the switches with such luck that three sinusoidal signals are obtained, dephased between themselves, which feed the coils of the induction motor stator. Initially this solution has an interesting result but overlooks the motor slipping control, because it itself, upon feeling a frequency variation will tend to increase or decrease its velocity in relation to the frequency fed, but if the motor has coupled to its axis a large mechanical load which causes a great inertia, the rotor will not be able to follow the magnetic field frequency induced by the stator, thus increasing its dephasing or slip between the angular velocity or magnetic field frequency and the mechanical velocity of the rotor shaft. Said control ends up being important knowing that there is no point to keep on increasing the stator frequency if the rotor cannot follow it, it would only cause overheating of the motor and even reach a frequency in which there is no induction on the rotor and it can cause it to stop.

Thus with the intention of resolving these and other inconveniences in addition to providing a precise, reliable and low cost control, among others, a solution is proposed, objective of the present invention.

BRIEF DESCRIPTION OF THE INVENTION

Induction motors were conceived to work at a constant velocity, however, it is possible to vary their velocity, but for this keep in mind the following equation:

$$N2 = (120(f)(1-s))/P$$

Where:
N2 is the rotor velocity,
F is the frequency with which the stator feeds,
S is the dephasing,
P is in number of poles, Thus, in order to modify the rotor velocity, it is necessary to modify the number of poles, dephasing or frequency. In the first case it would be necessary to use two different winders or to reconnect one simple winder by means of an interrupter; through which the number of poles could be changed, however it ends up being highly impractical as we would only have access to one pair of fixed velocities and not to a whole gamut of velocities. This can be achieved by any other means, like for example, a gear box or pulleys with a clutch. Modifying the dephasing also ends up being somewhat tedious as was previously discussed in the background, where a rotor is landed or winded to some rings or bearings and these in turn, are connected to electric resistances which can be variable. Thus varying the resistance one can vary the dephasing and thus the motor velocity, as the rotor will "feel" a charge which prevents it from following the frequency of the stator. The third method which has surfaced lately is frequency modification, which previously was done using Variable Frequency Drives (VDF), which initially applies a very low frequency for its start, which slowly increases until reaching their desired velocity. This method at low velocities can cause the motor to overheat, even though this application is good when high starting torques are required with low current; the opposite also works for braking.

Another method to control frequency is PWM (Pulse Width Modulation) in which electronic means generate a train of wide determined pulses/time at constant voltage, in such a way that it simulates a sinusoidal wave in the air dephasing. Several techniques to achieve this are known; a variation of this methodology is found in the SVPWM (Space Vector Pulse Width Modulation), where the vectors describe the switches of a sector of a hexagon, and in this way can represent a rotational voltage vector within a circle generated by the values of the switches/time.

Thus using any of any these methodologies, some sinusoidal can be simulated in the air dephasing of an asynchronous motor (preferably tri-phase) which can energize the rotor for it to turn. It should be remembered that the rotor "follows" or tries to follow the electromagnetic field generated by the stator, not turning at a synchronous velocity, as if the rotor is in synchrony then it would not have torque, thus the difference between the magnetic field in the stator and the mechanic velocity in the rotor is called slip. An efficient velocity control of an induction motor takes into consideration a range or slip tolerance, since if a certain frequency is induced into the stator which the rotor cannot follow due to the charge coupled to this, it would not make sense to keep increasing or decreasing the frequency in order to change velocity, as this would only cause overheating, as well as a high use of current. Thus it is convenient to monitor the rotor velocity when velocity (frequency) of the stator magnetic field is changed.

The present invention proposes a method to allow the monitoring of the rotor mechanical velocity and to maintain slip within a determined range, so that the rotor can "follow" the frequency. This allows saving energy by not forcing the motor to reach a velocity which it cannot attain; the charge or torque which the rotor is feeling can also be determined; the torque can be changed by letting the voltage remain constant, knowing that, generally, an induction motor maximum torque has low slip and with frequencies close to the work frequency or specified on the motor plate, and in low frequencies up to the point of maximum torque the curve is linear, which allows to predict with great exactness the rotor charge. Additionally if it is considered that the torque for any given slip, is proportional to the square of the linear voltage, by varying the frequency and controlling the slip, predetermined torques can be achieved thus also controlling the potential factor; this being of particular importance in certain applications such as can be a washer's agitation where a certain torque is applied to the agitator depending on the type of clothing, as well as the amount which is set in the washer's basket; it also controls the velocity of the agitator, through which one can decrease the energy consumption, as well as avoiding damage to clothes. In this same order of ideas the velocity at which the basket turns can also be controlled in the dehydrating or centrifuge stages, as the natural frequencies have to be "skipped" which depend on the shuffling of clothes within said basket, among many other functions which can be granted to clothes washers. In a refrigerator it could be controlled the velocity and starting torque in a compressor with the aim of saving energy; in similar manner a gamut of operational velocities of a compressor can be obtained to force it to deliver a higher mass volume to cool faster or vice versa.

Thus the applications of this technology for household appliances can be in a wide array, this aided by the low cost of the micro-controllers, which have a greater processing capacity as time goes by, typically "pre-installed" or "built in" features which allow for the generating of PWM pulse trains and varying their frequencies with great ease.

Thus, the proposed electronic control takes the linear mono phase voltage, and this is filtered to subsequently be rectified, and then sends the energy to a "doubling" module which doubles the rectified voltage and places it at the disposal of the drivers or gates in a tri-phase inverter arrangement bridge, which has at least 6 drivers or doors, and these will be activated by the electric control in a determined order which will also generate the PWM pulse train so that said drivers or doors allow the passage of high voltage towards a tri-phase coil of the stator. It also has an extra driver or door which allows for the flow of energy at a resistance, which will help to dissipate heat when the motor experiences a deceleration. The resistance arrangement can also have a buffer which can help to store some of the energy or absorb the arrival of this towards the resistance. Thus, when the motor undergoes a deceleration, the control interrupts the pulse train and orders the resistance driver to open, knowing that upon interrupting the pulse train towards the motor and should this keep on turning, it suddenly becomes a generator, now having the inconvenience of having to dissipate said energy coupling a "charge" or "consumer" to the "generator" to help to stop the rotor.

Similarly, line current is taken and passed through a transformer which reduces its voltage to rectify it later and this enables it to deliver a low voltage (preferably 5V) which will help to feed the microcontrollers, detectors (sensors), buttons, leds among other peripheries.

Thus, the slip control is achieved by applying an initial frequency in PWM pulse train to the motor by means of the electric control and the drivers in the tri-phase inverter arrangement bridge. A velocity (sensor) detector (preferably a Hall type) sends a pulse train to the microcontroller, and this converts them into velocity and compares it to the frequency which it is actually sending to the motor stator; this is for determining a slip, which is compared to a slip table in the microcontroller memory; if the slip is lower than what is allowed, it means the rotor has a low charge coupled and that this may follow with greater ease the magnetic field frequency, so that the microcontroller can decrease the time between frequency increases. Thus, having exhausted this time, the frequency is increased in a determined amount, for example 1 Hz. Once having increased the frequency the slip is measured again. The process is repeated until reaching an objective velocity or frequency. Thus, during the process the slip is measured and if this is higher than what is allowable, this could signify that the charge to that velocity represents a high torque, same which can be due to problems of a mechanical type such as unbalancing, something being caught in the mechanisms, etc., so that to the electric control it signifies that the rotor cannot follow the frequency of the magnetic field in the stator and, as a consequence, takes one of the following actions: at first, it lengthens the time between frequency increases, in order to grant a longer time so that the rotor "reach" an objective velocity or shorten its slip; if after this time has lapsed, the rotor has not "reached" the objective velocity or did not shorten its slip or it is not found within the acceptable parameters, then the control decreases the frequency by a determined quantity, for example 1 Hz; in the opposite case, that is, if the rotor during the wait time did indeed reach its objective velocity or the slip is acceptable, then the frequency is increased by a determined amount, for example 1 Hz; this cycle is newly repeated until reaching the objective velocity or for an objective time, depending on the application or the specific household appliance.

Through this a "smooth" start of the motor is achieved, controlling the consumption of energy and potential factor supplying torque and velocity according to the charge set in the rotor axis.

DETAILED DESCRIPTION OF THE INVENTION

Definitions

Figure 1:
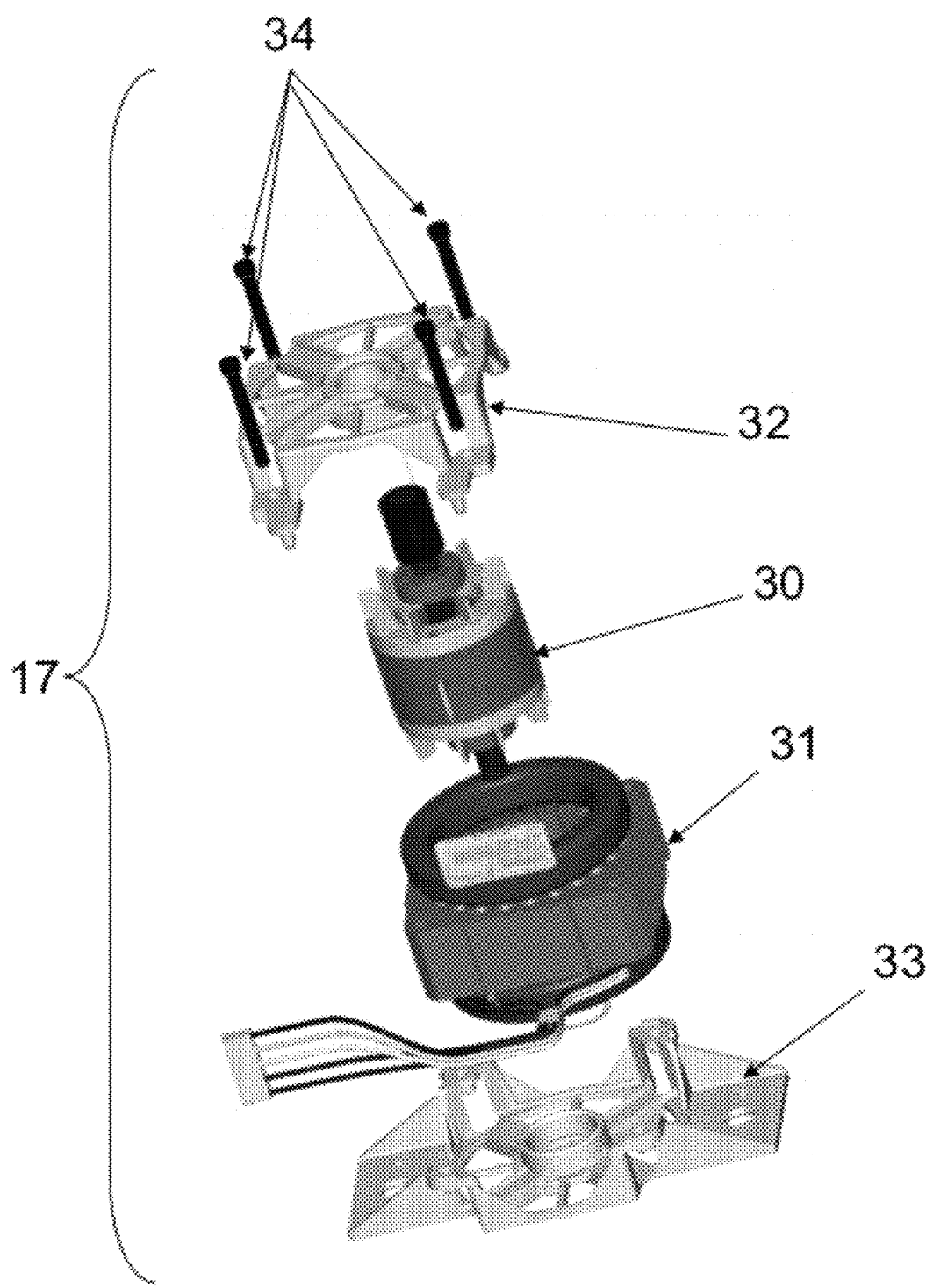
FIG. 1 shows an exploded view of an asynchronous squirrel cage motor.

Slip—The magnetic field generated by the stator windings induce a voltage to the rotor, which generates a current flow on the cage bars. This current creates a magnetic field which reacts with the stator magnetic field, producing the torque which moves the motor. The rotor attempts to follow through its movements the stator magnetic field, turning to an angular velocity $\omega$. The rotor's turn velocity is only equal to that of the stator's $\omega s$ when the motor is empty, that is, without friction. As the demand for torque increases on the axis, the motor decreases its velocity then turning at an angular velocity which is always lower than the stator angular velocity. This is called slip and it is defined as:

$$s = \frac{\omega_s - \omega}{\omega_s}$$

Where:

Ws is the angular velocity of the stator magnetic field;
W is the rotor angular velocity; and
S is the slip.

Induction Motor—Also known as "squirrel cage motor" owes its name to the rotor shape: it is formed by two copper or aluminum rings, which are united (short circuited) by several bars made of the same material. The stator is formed by three star shaped connected coils. The distribution of the coils is made in such a way that the magnetic field inside the motor has a sinusoidal dependence. The coils are separated 120 mechanical degrees between them.

PWM (Pulse Width Modulation) which comprises generating by electric means, a train of determined wide pulses/time at constant voltage; in such a way that it simulates a sinusoidal wave in the air dephasing.

SVPWM (Space Vector Pulse Width Modulation), where the vectors describe the switches of a hexagon sector, in this way a rotating voltage vector can be described within a circle generated by the values of switches/time.

D.C. Direct Current
A.C. Alternating Current

Drivers or Controllers—Electric switching circuit which can be made of three legs, where each leg has two interrupters, where one connects to the positive terminal and the other interrupter to the negative terminal, and both interrupters cannot be activated concurrently. The switching effect of the interrupters generates a sinusoidal signal to feed the motor windings.

Inversing Bridge—Converts DC voltage into AC

Leg—A leg is a third of an inversing bridge formed by two transistors.

Doubler—It is a rectifying circuit which by means of capacitors doubles the entry voltage.

Rectifiers—These convert or serve to convert the AC voltage into DC, they allow flow in one direction only.

Swats—The circular movement of an agitator or propeller 22 in clockwise or anticlockwise directions for a determined period of time; this is attained when the clutch is found in agitating mode, a motor 17 energizes the agitator or propeller 22 which is mechanically coupled to the motor 17, the movement of the motor is described as a determined arc which is measured thanks to a Hall detector 18 which detects the rotor 30 position, knowing that the latter sends a string of pulses to a microcontroller 47 which counts the pulses, as said microcontroller 47 comprises a reference directly proportional between number of pulses counted and the arc described by the movement of the agitator or propeller 22. Thus, when the microcontroller 47 senses it has reached the desired arc, the induction frequency to the motor 17 is interrupted, and stops the time counter of the inner timer, knowing that the agitator or propeller 22 in order to effect its slip and follow the trajectory of the desired arc has a specific time, if this specific time lapses before the agitator or propeller 22 finishes its angular slip, the microcontroller 47 can, in a preferred embodiment, begin counting a determined waiting time which varies between 0.01 seconds to 5 seconds, once the condition of angular displacement or the course of time has taken place. Said waiting time shall have to take place before beginning a new swat in the opposite direction to the one immediately previous.

Agitation—Movement obtained over the objects to be washed by the action of the agitator or propeller 22 on the first immersed objects into the washing mixture.

FIG. 1 allows for visualization of an electric motor, particularly a squirrel cage induction motor 17, which has a rotor 30, a stator 31, a carcass 32 which ensures the assembly of the rotor 30 within the stator 31, and a support 33. Said carcass 32 in its lower part has a hole and a track through which a motor shaft 17 passes and houses the bearing which is mounted on the shaft. While the support 33 also has a hole and a track through which the motor shaft passes, which on this end also has a bearing which is set on the track of the support 33. The whole assembly is pressed together by a set of screws 34 encasing the rotor 30 within the stator 31.

Figure 2:
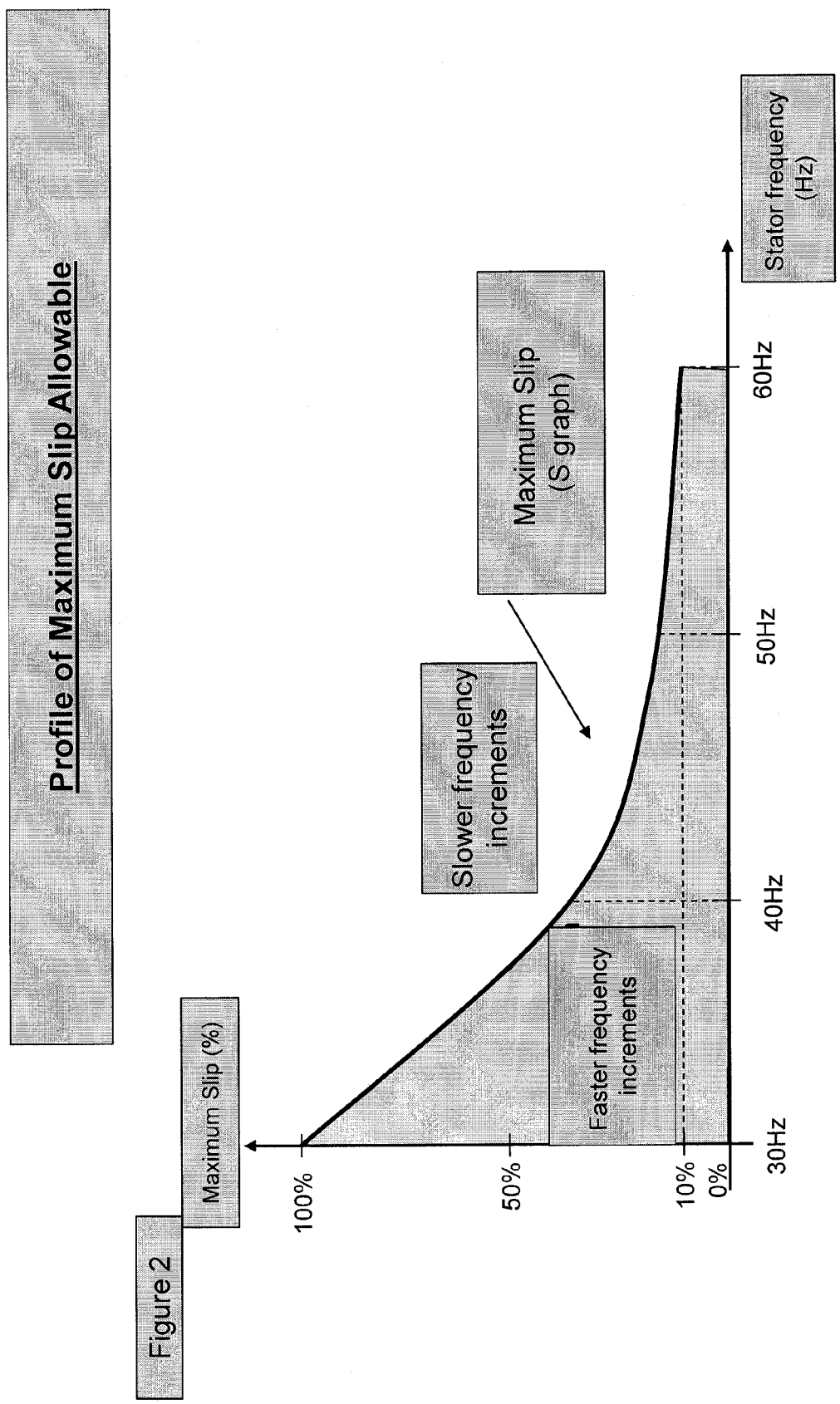
FIG. 2 shows a graph of the slip profiles allowed in an asynchronous squirrel cage motor.

The referred motor 17 is preferably an asynchronous tri-phase machine. This type of motors cannot reach their synchronous velocity and always have a small slip between the stator 31 and the rotor 30 frequencies which can be measured by adapting any velocity or position detector to the shaft or rotor 30 of the motor, so that if, on the one hand the frequency to which the stator 31 is excited is known, this frequency divided by the number of poles corresponds to the rotational velocity of the magnetic field, and the latter will induce a frequency to the rotor 30 so that this may attempt to follow it without being able to reach synchronous velocity. This difference of velocities or frequencies is called "displacement" or "slip", and depends somewhat on the construction of the motor itself (knowing that these are made to work at a constant velocity which depends on the load, but that, with modern electronics its velocity can be changed by varying the frequency with which the stator is excited), but in the greater part of the charge tied to the rotor 30 shaft. Thus, if the charge is very large, the slip will be greater; the lower the charge, the lower the slip, at a higher frequency at which the stator 31 is excited also has an impact on the velocity at which the rotor 30 can turn, since lower frequencies can have greater frequency increments, and at higher frequencies the frequency increments have to be smaller (see FIG. 2), since it is harder that the rotor 30 be able to "follow" the frequency changes, given that it has less torque at higher frequencies by maintaining constant voltage in the relationship Frequency/Voltage.

Thus to achieve movement, the motor provides a mechanic torque to the system. For an excitement frequency to the stator 31, the mechanic torque which the rotor 30 provides depends on the slip of the rotor 30 velocity with respect to the turning velocity of the magnetic field of the stator 31. The acceleration index, that is, the speed of the changes in frequency is determined by the system response and is regulated by the slip allowed to the rotor 30; stated in another way, the slip allowed depends on the torque demand by the system. If low slip is allowed, very small torque will be generated by the motor 17. So that the motor 17 slip is maintained within a certain range to achieve maximum benefit; said range lies between 5% to 30% of the stator excitation frequency (see FIG. 2). Given that a required torque is calculated for each frequency of the associated slip, a table with an acceleration profile and slip per movement is compiled.

Thus the motor 17 control enters into play as a function of the charge tied to it; so that the PWM technique is preferably used or in an alternative embodiment, the SVPWM, with the purpose of supplying each coil of the stator 31 with a determined voltage pulse and duration, thus generating a pulse train with a determined order which can generate a sinusoidal signal in the stator 31, which in turn has an angular determined velocity. This helps to induce energy to the rotor 30, which, as previously indicated, will rotate at a given angular velocity which will depend on the charge tied to its shaft as well as to the frequency fed to the stator 31; thus having a sophisticated electronic control which emits the generation of pulses to excite the stator 31, which additionally allows, with certain ease, the modification of frequencies of the referred pulses to obtain different angular velocities, both in the stator 31 magnetic field, as well as those obtained by the induction of said field over the rotor 30, from which an angular mechanical velocity is obtained which can be measured in the shaft of said rotor 30. Thus the motor 17 is coupled to a detector 18, preferably Hall type, which will emit a series of pulses which depend on the rotational velocity of the rotor 30 shaft.

Figure 3:
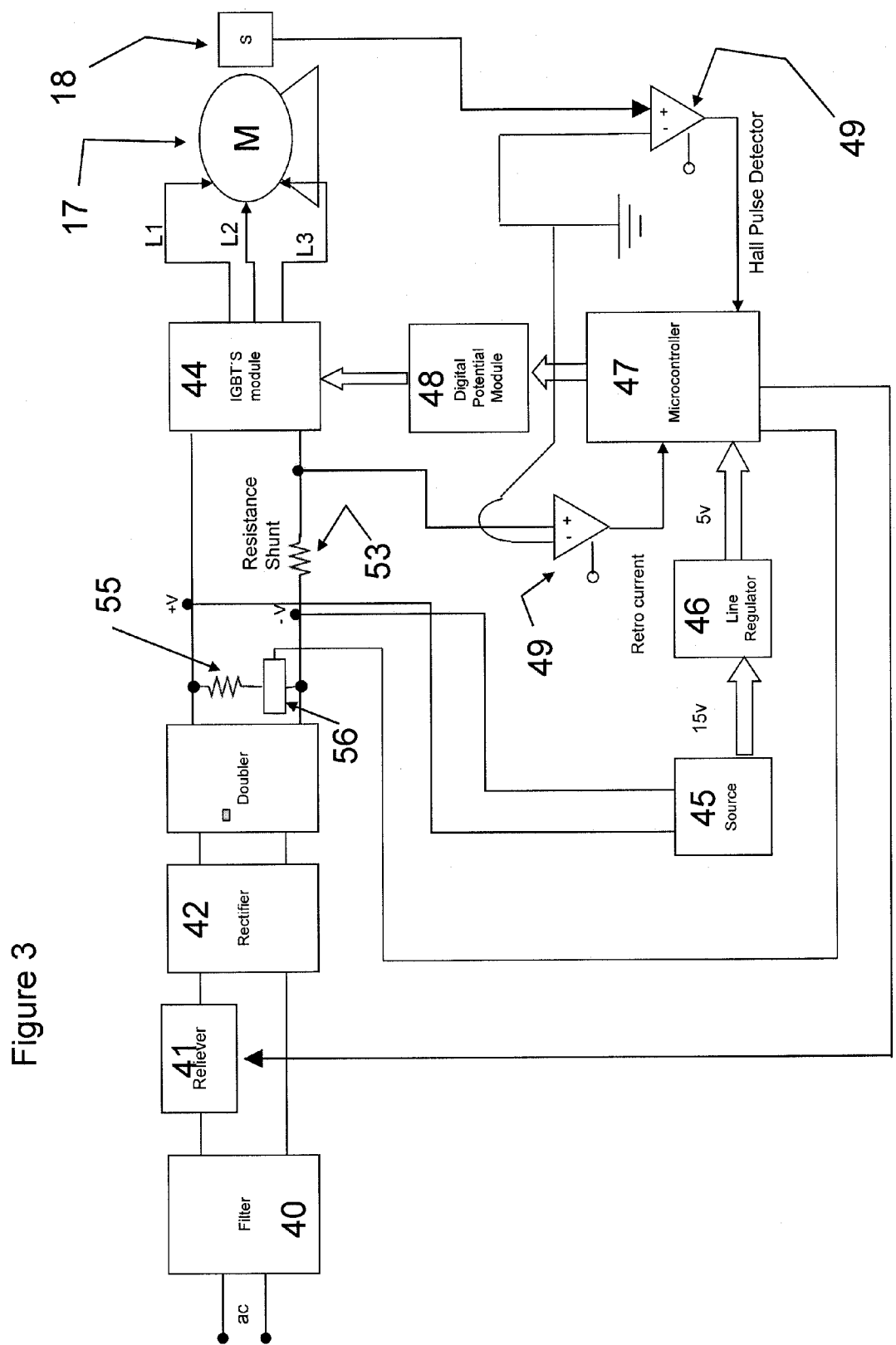
FIG. 3 shows a functional block diagram of the present invention.

FIG. 3 shows a block diagram of the electric control disposition aspect of the present invention, in such a way that block 40 represents a line filter which can be composed by capacitors or any other element which aids in noise removal in the line. In a preferred embodiment the filter 40 has a relay 41 connected to one of its terminals which disconnect the feeding toward the rectifier 42; said relay 41 is controlled by the microcontroller 47. In an alternative embodiment, said relay 41 can be omitted. Thus, after the filter 40 a rectifier 42 can be found which has a diode arrangement which rectify the line current. Connected to said rectifier 42, a voltage doubler 43 is found composed of capacitors in series which reduce the curl delivering a constant current (CC) voltage with greater voltage than that measured at the rectifier 42 output. In the negative terminal of the doubler 43 an electric resistance is placed where said resistance is named shunt resistance 53; the remaining terminal from said shunt resistance 53 previously referred to, is connected to a potential module IGBT 44, which also receives a doubling terminal 43, from the potential IGBT module 44 three lines L1, L2 and L3 exit and feed the motor 17. Thus also, just at the doubler 43 output, between lines V+ V−, parallel to said doubler, a second electric resistance is placed, which is a braking resistance 55 which will help to dissipate energy when the motor is found in decelerating mode. Said braking resistance 55 has in series form immediately adjacent a driver 56 controlled by the microcontroller 47, so that the latter can activate or deactivate said braking resistance 55 when required. The referred driver 56 can be in declarative form but not limitative form a piloted switch, a reliever, transistor, IGBT, Triac, among others.

From the doubler 43 output terminals, where a node per terminal is present, energy is derived (which is high direct current voltage DC), to feed the source 45. On the source, voltage is adapted and lowered until reaching a range lying between 10V to 20V. Said source 45 can be constructed in various ways, such as an expert in the field can deduct, design or choose, as an example a source with a transformer and capacitors can be present, or a "switching" source which based on a PWM generator and a small transformer can deliver voltage in DC. Thus after having reduced the voltage to a given value within the range previously described, the energy now passes through a line regulator 46 which removes the curls and the noise which the voltage can transport, said regulator 46 can be composed by a series of capacitors or any other device which helps to obtain a stable voltage and which is within the 5 V to 10 V range, as it is with a given voltage value within this last range, that shall feed the microcontroller 47, digital potential module 48, operational amplifiers 49, among other electronics and peripheries. The microcontroller 47 itself is what controls the digital potential module indicating to it when it should send a pulse train, when to stop, in what direction it should turn the motor 17, and the velocity at which it should turn it; it also receives the signal from the Hall Effect Detector 18, as well as a signal for current retrofeeding which is taken after the shunt resistance 53, and before the IGBT potential module 44. Said microcontroller 47 can have other functions which will depend on the system on which the present invention is mounted, the microcontroller 47 can be an 8 bit or higher microcontroller, with at least 2 Kbytes of ROM memory of ROM memory and 512 bytes of RAM memory.

Figure 4A:
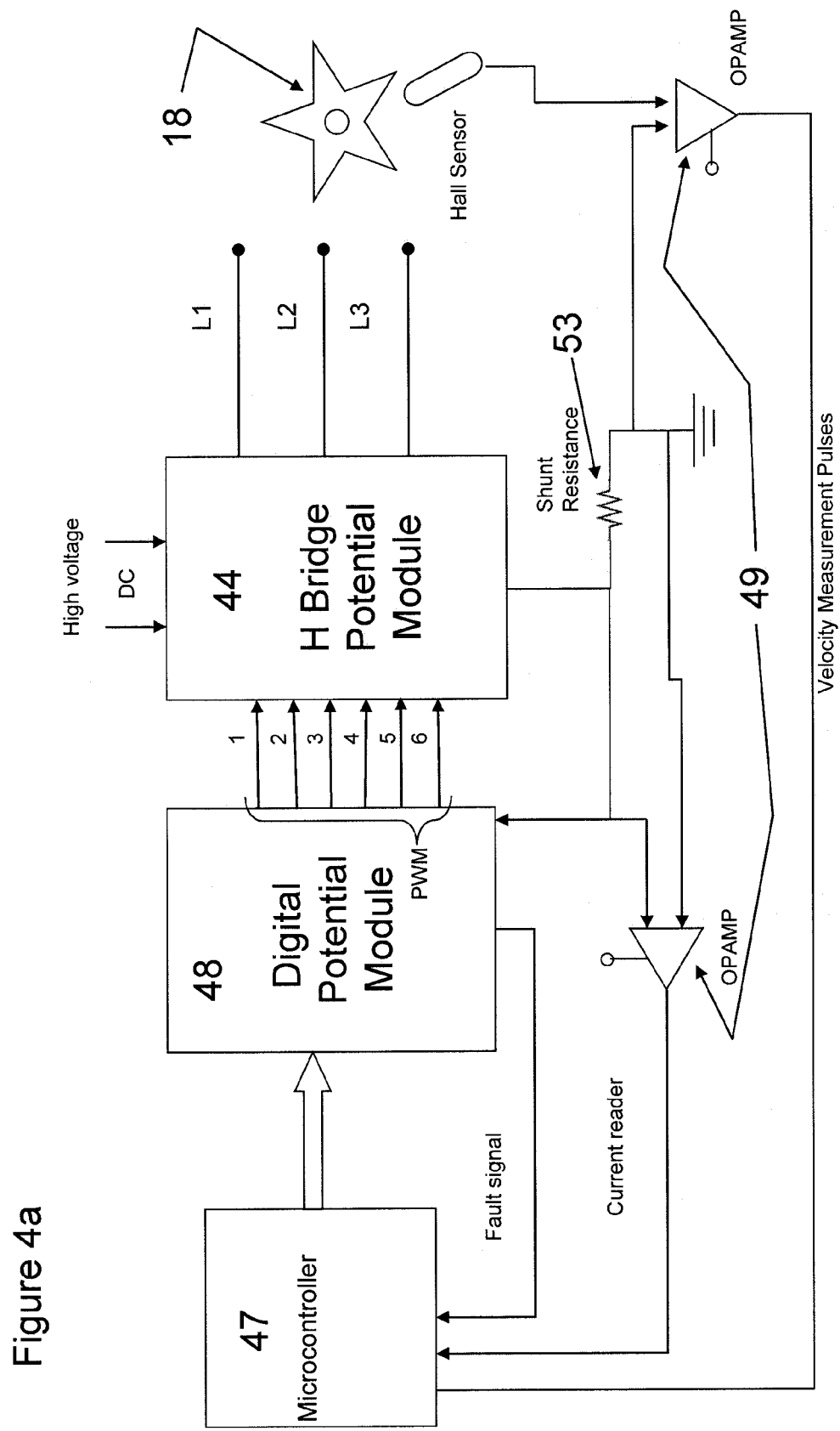
FIG. 4a shows a functional block diagram which shows a first embodiment of the present invention.

As is shown in FIG. 4a, the digital potential module 48 receives the indications from the microcontroller 47 and generates PWM pulse trains with a given frequency, which is determined by the microcontroller 47. So that the digital potential module 48 delivers six lines to the IGBT potential module 44 which receives them, adapts and couples them to an H bridge 50 which is found within a potential module 48. Said transistor gates or switches 51 will allow the passage of high voltage in DC by means of lines L1, L2, L3 towards the stator 31 of the motor 17 (see FIG. 5).

Figure 4B:
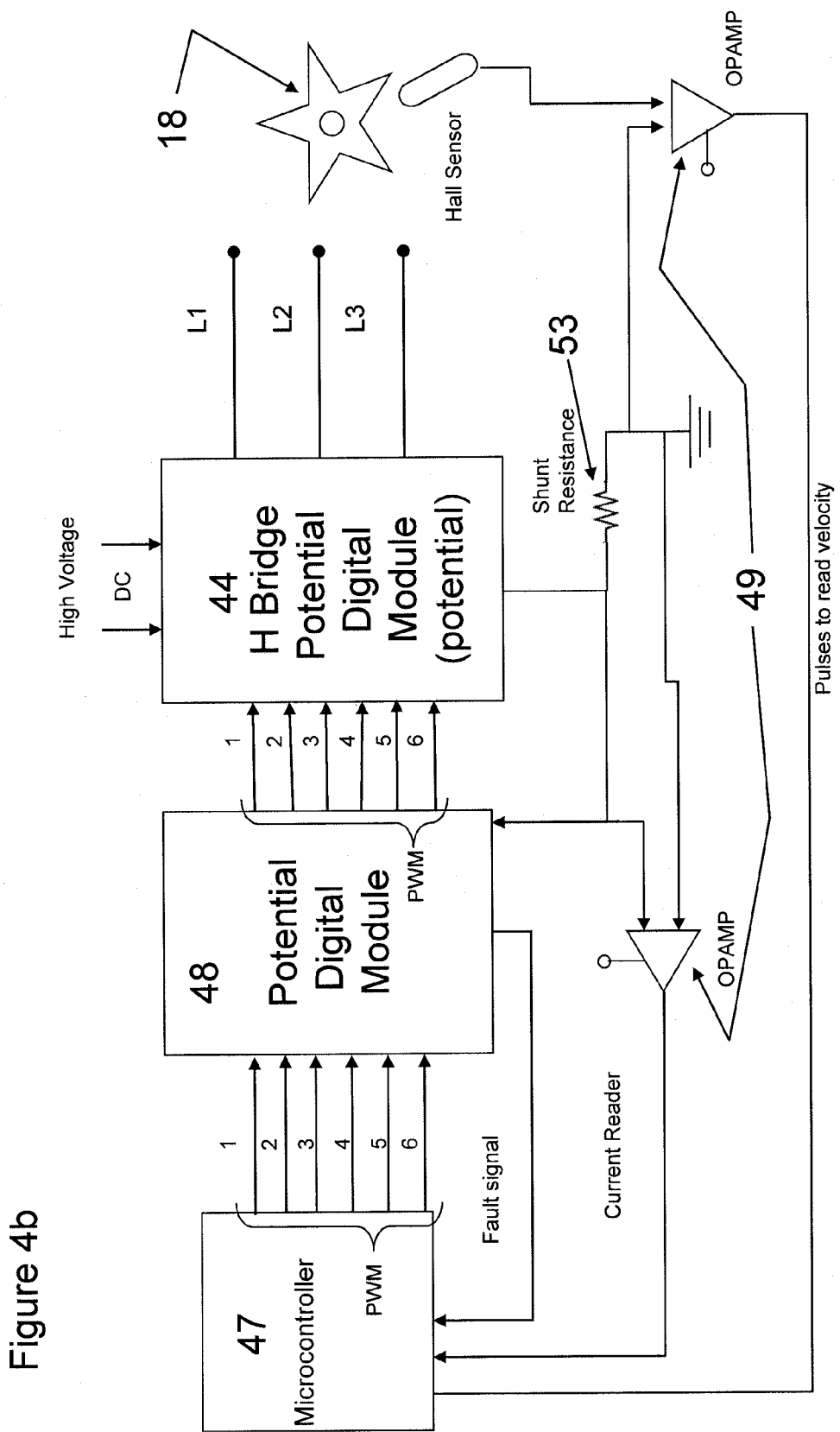
FIG. 4b shows a functional block diagram which shows a second embodiment of the present invention.

In an alternative embodiment shown in FIG. 4b, the digital potential module 48 itself generates the PWM pulse trains with a determined frequency. The digital potential module sends by means of six lines the PWM pulse trains to the digital potential module 48, which in turn adapts and couples them so that the PWM pulse trains (or control signals 54) can successfully activate the transistors, gates or switches 51 of the H bridge which are found within the potential module 44. So that said transistor gates or switches 51 can allow the passage of high DC voltage by means of lines L1, L2, L3 to the stator 31 of the motor 17 (see FIG. 5). The referred modules 44 and 48 in a preferred embodiment can be found in one single module or package, where these are called dual potency modules or IPM's (intelligent power modules), such as, Powerex Inc's PS216963-4E, PS216963-4AE, PS216963-4CE, or any other similar which has a digital part which adapts the signal to a potential part.

Figure 5:
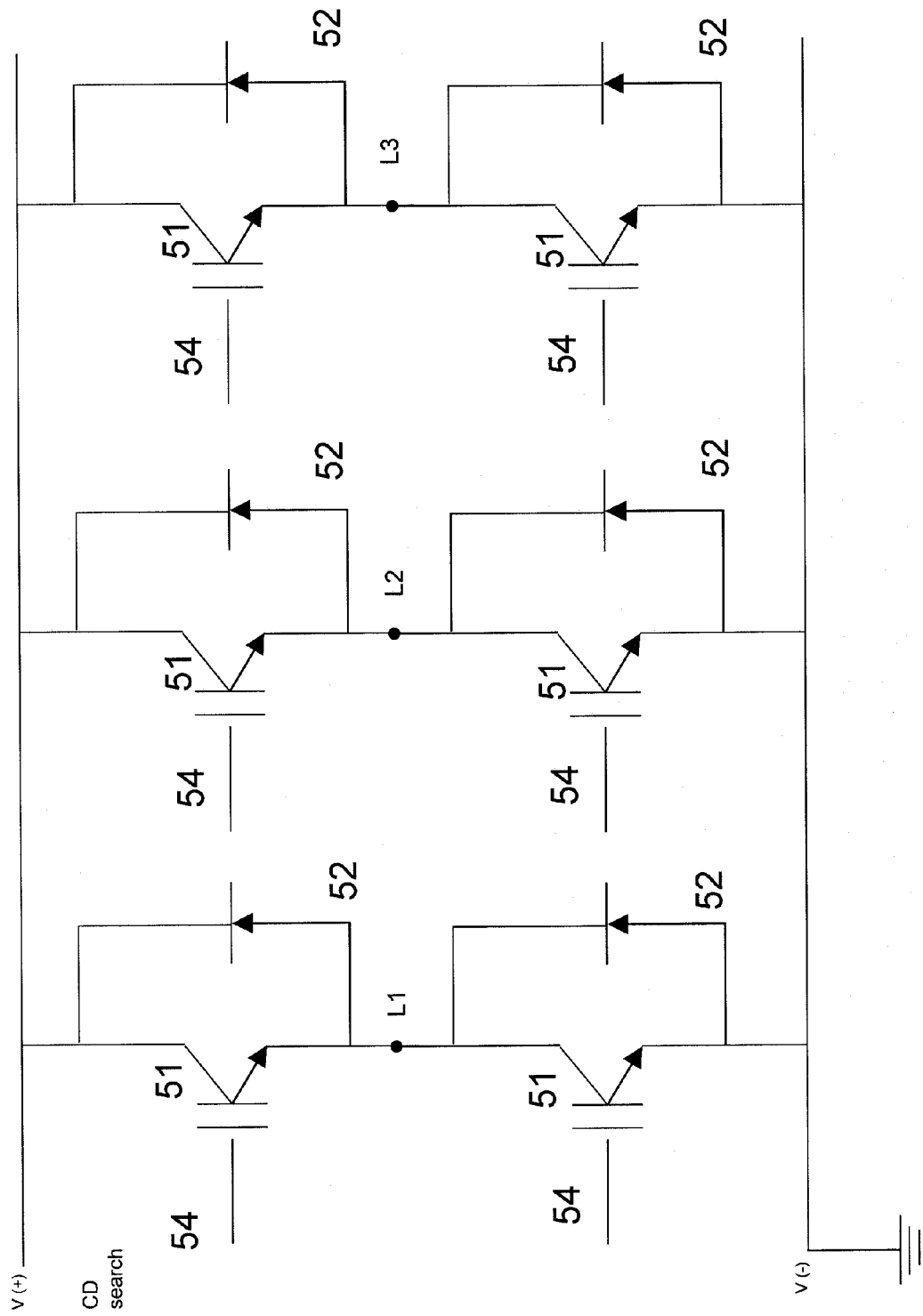
FIG. 5 shows a potential bridge H.

Paying close attention to the IGBT potential module 44 which has an H bridge shown in FIG. 5, where the arrangement which each transistor has, in parallel and with antagonistic direction to a diode 52 can be seen. This arrangement is repeated in series one time and the two transistors 51 in series are repeated three times in parallel; which forms the H bridge. This design has the advantage of one single transistor per leg can be activated at any given moment; the feeding sum for the three legs is what produces the stator's rotational magnetic field. It is also gathered from this configuration that the order in which each transistor, gate or switch 51 is activated by means of a signal 54 emanating from the digital potential module 48 is of particular significance, so that a good microcontroller capable of generating the PWM which activates said transistors, gates or switches 51 in a quick, reliable and safe way. Thus, said H bridge architecture has another advantage, that is when the motor 17 decelerates or stops, since as is well known, the induction motors can be transformed into generators as long as the stator's 31 magnetic field turns at a velocity lower than the rotor's 30 turn velocity.

Thus there is an inverse effect to acceleration, that is: as long as a lower frequency is applied to the stator 31 than that of the rotor's 30 turn frequency, the motor 17 will behave like a generator thus charging the capacitors which are in the voltage doubler 43. It should be mentioned that the generated voltage which is found in the doubler terminals 43—named Vbus—can grow in excessive manner and can harm the doubler 43 if a protection mechanism which can absorb the generated energy is not present, the braking resistance 55 (upon being activated by means of its driver 56) consumes and dissipates said excess energy, allowing to maintain the doubler 43 Vbus voltage within an operational voltage range where it can be assigned a determined value named Vobj.

Once the motor 17 has accelerated or reached a working velocity, at a certain moment it is to be decelerated. A somewhat evident solution to this is to de-energize the motor 17, but in certain applications this could be inconvenient, such as in a mixer or a crusher, where the ability to take the motor to resting position may be important. Thus, the present configuration of the electronic control has the capability of stopping in a safe manner until the rotor 30 reaches a resting position, (the time it takes the motor 17 to reach a zero or low angular velocity will depend on the load inertia coupled to the rotor 30 shaft). Thus, by means of lines L1, L2, L3 a voltage higher than that which was fed to the stator 31 is returned in an orderly way, so that by means of the activated transistor, gate or switch 51 will be allowed the passage of energy to the doubler 43; it is worth mentioning that each transistor, gate or switch 51 has a diode 52 which, as can be seen in FIG. 5, is antagonistically or oppositely oriented to the direction of the transistor, gate or switch 51 to which it is coupled to in parallel. This allows the motor 17 when it is in generator mode, to prevent the energy emanating from said motor 17 from escaping from the trapdoor, and additionally, to be rectified to be able to enter through the transistor, gate or switch 51 which is active, thus allowing the flow of energy towards the doubler 43. According to FIG. 3, we can see that between the doubler 43 and the IGBT 44 module, there exists a braking resistance 55 is found with its respective driver 56, which is controlled by the microcontroller 47. Thus, when the voltage from the energy emanating from the motor 17 and measured between the doubler 43 terminals V+V−—Vbus—exceeds a high limit (Vobj), which is such that, it allows the correct operation of the doubler 43 capacitors (since if Vbus is too high, it could cause damage to said capacitors), the microcontroller 17 by means of the driver 56 will activate the braking resistance 55 so that it may help to dissipate energy and through this contain Vbus within acceptable operational parameters. Also, in a simultaneous way or following a certain order (which shall somewhat depend on the application, memory limits and entry/exit ports in the chosen microcontroller 47), the current which passes between the resistance shunt 53 and the IGBT module 44 shall also be checked, which is amplified and adapted (49) so that the microcontroller 47 can read—Ile− and compare it to a maximum current—Imax−. If Ile<Imax then the current is within the acceptable operational parameter so that the microcontroller 47 can partly discount the frequency F of the PWM (the jump amount or the part which it discounts will depend on the application to which the present invention is mechanically coupled to); if the opposite is true, that is Ile>Imax, the microcontroller 47 will not decrease frequency F of the PWM until this situation is reversed. Once the rotor 30 velocity is very low or the frequency F of the PWM reaches a low value (for example 10 Hz), in certain size motors this may mean that its generation capacity has been exhausted, thus, in a preferred embodiment, a brake in direct current DC can be applied—brake in DC—which involves applying a constant voltage to the motor windings 17 to completely stop the rotor 31, thus converting the stator 31 into an electromagnet which attempts to stop the rotor 30.

Thus, when a fault exists in the supply of electric energy, the present arrangement can generate energy for some instants which helps the motor 17 to reach a low velocity in a safe way. In this instance, the rotor 30 keeps turning and the stator 31 is energized, so the motor begins to send energy back through the H bridge in the same manner previously discussed, towards the doubler 43 which stores the energy in its capacitors. Taking advantage of this phenomenon on the doubler 43 exit, between its terminals, a braking resistance 55 is placed there and its respective driver 56, which is controlled by the microcontroller 47, the braking resistance 55 consumes and dissipates the excess energy protecting the doubler, the rest of the energy helps to feed the microcontroller 47, in addition to the peripheries (like for example elements 49, 18, 56, 41, 45, 46, among others) and the motor 17 (see FIGS. 4 and 5). This allows the source 45 to draw energy which is returned towards the doubler, consume it and adapt it, delivering a determined voltage (such as has been described), sending said voltage towards the regulator 46 which in turn adapts the voltage rectifying it and reducing it (within the range already described). The microcontroller 47 keeps energizing in conjunction with the potential modules 44 and 48, while the rotor 30 velocity is such that it can keep generating an energy amount whose voltage allows it to be stored in the doubler 43 capacitors (for example higher than 10 Hz). Once the velocity is very low, the voltage emanating from the motor 17 is so low that it cannot be stored in the doubler 43 capacitors which will cause these to empty as they will have to feed the IGBT module 44 with a high voltage in addition to feeding the microcontroller 47 and its peripheries, without forgetting the braking resistance 55 which will continue to dissipate energy as long as it is needed (that is, if the voltage of the doubler terminals 44 Vbus does not exceed a safety voltage or greater than that which the capacitors which are found in said doubler can accept-Vobj) during the whole deceleration process described. Thus, the rotor 30 is decelerated in a safe way until it reaches a low safe velocity or even to a resting position.

In an alternative embodiment of the present invention, a set medium frequency can be anticipated—Fmed− of PWM, that is, comparing the frequency F of the PWM to the frequency Fmed, which can for example hover around 150 Hz. So that when F<Fmed, the microcontroller 47 somewhat decreases the Vbus voltage, with the purpose of maintaining the rotor 30 turning for the longest possible time. The current which passes between the shunt resistance 53 and the IBGT module 44 shall also be checked, which will be amplified and adapted (49) so that the microcontroller 47 can read it—Ile– and compare it to a maximum current—Imax–. If Ile<Imax, then the current is within an acceptable operational parameter so that the microcontroller 47 can partly discount frequency F of PWM (the jump amount or the part which it disconnects will depend on the application to which the present invention is mechanically coupled to). If the opposite is true, that is, Ile>Imax, the microcontroller 47 will not decrease frequency F of the PWM until this situation is reversed. Once the rotor 30 velocity is very low or the frequency F of the PWM reaches a low value (for example 10 Hz), in certain size motors this may mean that its generation capacity has been exhausted, so the microcontroller 47 can start in stand-by fashion or turned off-allowing the motor to turn until the rotor 30 reaches its rest position.

Control Method for Acceleration

Figure 6:
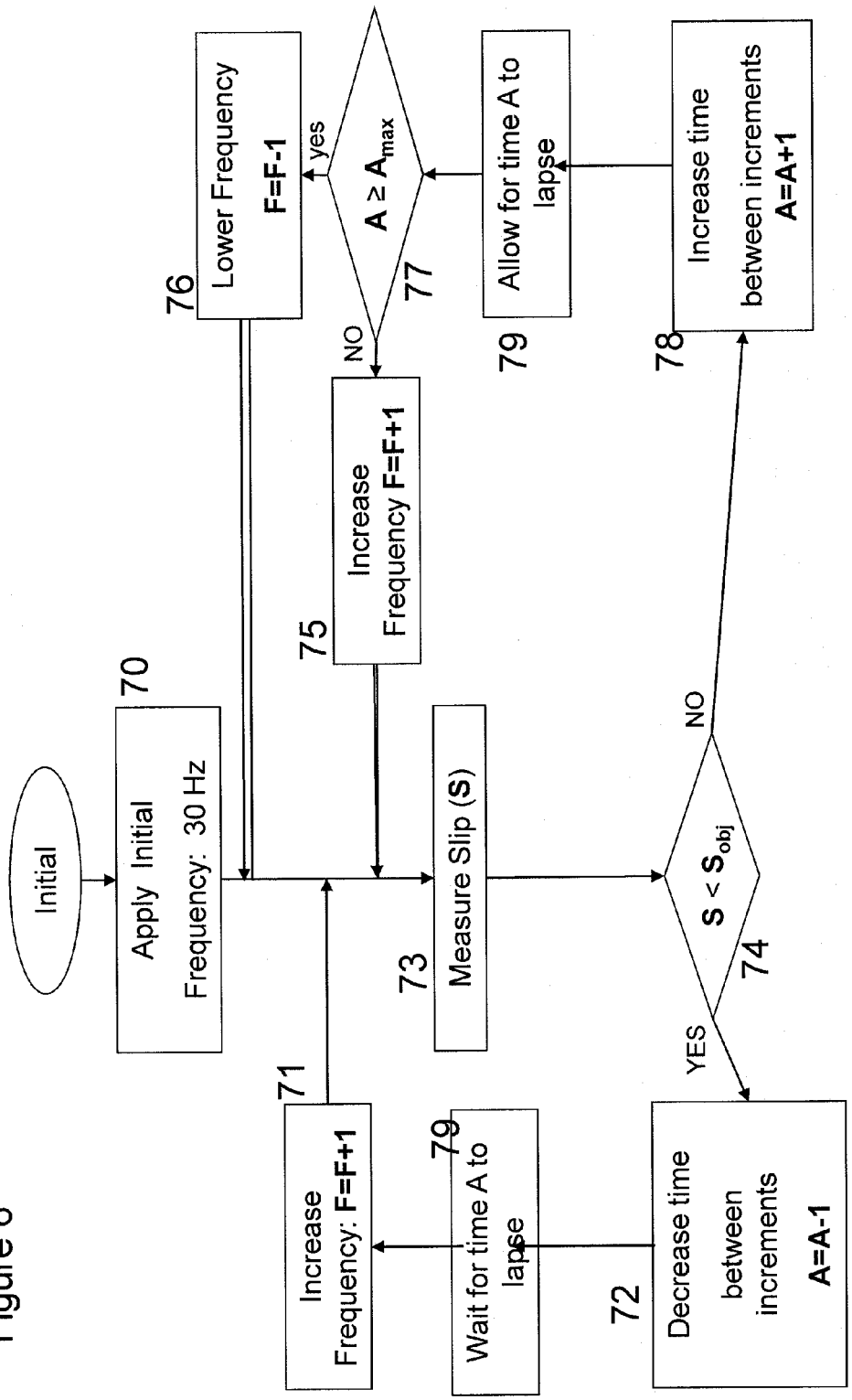
FIG. 6 shows a flow diagram of the control method for the motor acceleration aspect of the present invention.

FIG. 6 shows a flow diagram of the system's control method previously described. Thus, the initial step is to energize or connect the system to an AC feeding line. Once connected and energized, said system generates a PWM with an initial fixed frequency F (block 70) which can vary between 1 Hz and 40 Hz (the specific frequency depends on the capacity, as well as on the construction of the motor 17, and additionally will depend on the type of charge or machine to which the motor 17 is coupled to). The initial frequency F is maintained for a determined period of time, which shall be sufficient for the rotor 30 of the motor 17 to reach a stable velocity and for the Hall Effect Detector 18 to send a pulse train to the microcontroller 47. This is followed by the microcontroller 47 translating the number of pulses of the Hall detector 18 into an angular velocity Vread, and compares it to the objective angular velocity Vobj (block 74). Said objective velocity is obtained converting the actual F frequency of the PWM which is being induced at that moment to the stator 31 in angular velocity, so that Vread is compared to Vobj. The difference in these magnitudes gives us the slip S in which the motor 17 is experimenting with the values (block 73). The slip S is now compared to an objective slip value Sobj (block 74) for the specific and current frequency F, (the values of Sobj for each frequency F are found stored in the microntroller 47 memory), if S is lower than Sobj it means the motor has a low slip value and that the rotor 30 can "follow" the magnetic field velocity induced into the stator 31. This allows for faster frequency changes, so that the predetermined time value between increments A is partly lowered or a unit (block 72). This is followed by waiting time A (block 79) upon starting a timer and stopping it until the timer's time be equal to the one represented by variable A. Once time A has lapsed, the actual frequency F is increased by one unit (block 71). However, if the opposite is true, that is if S is greater than Sobj (block 74), this means that it has a high slip value, said phenomenon can be caused by the charge coupled to the rotor 30 can be very great, so that it will not allow the rotor 30 to "follow" the magnetic field velocity induced into the stator 31. This causes the microcontroller 47 to increase by one unit the time between increments A (block 78), and then it waits for time A (block 79) to pass. Afterwards, it compares if present value of A (already increased), has not surpassed the maximum value of time between increments Amax (which has been previously programmed and stored in the microcontroller 47 memory) (block 77). If the value of A is lower than the value of Amax, this may imply that it takes the rotor 30 more time to "follow' the magnetic field velocity induced to the stator 31; this perhaps could be caused by a momentary "bogging" or inertia of the charge itself, so that the frequency F is increased by one unit (block 75). If the opposite is true, that is, if the value of A is greater than Amax (block 77), this can mean that the magnitude of the charge coupled to the rotor 30 in the present frequency F is causing said rotor 30 to not be able to "follow" the angular velocity of the magnetic field induced to the stator 31, so that the actual frequency F is decreased by one unit (block 76). This is follow by the step of slip measurement to restart the decision cycle once again.

In an alternative embodiment, the microcontroller 47 receives a signal emanating from the shunt resistance 53 line, which is amplified by the amplifier 49 to adapt the signal for the microcontroller 47. If the current demand is very high, this can be indicative that the motor 17 design parameters have been exceeded, having to modify the frequency which is induced into the stator 31, or that the charge is excessive, in this case being convenient to stop the motor 17 or reduce the velocity in the rotor 31; so that with the current readings microcontroller 47 can make similar decisions to the ones discussed previously or others which will depend on the system, machine or mechanism to which the present invention is coupled to.

Control Method for Deceleration or Braking

Figure 6A:
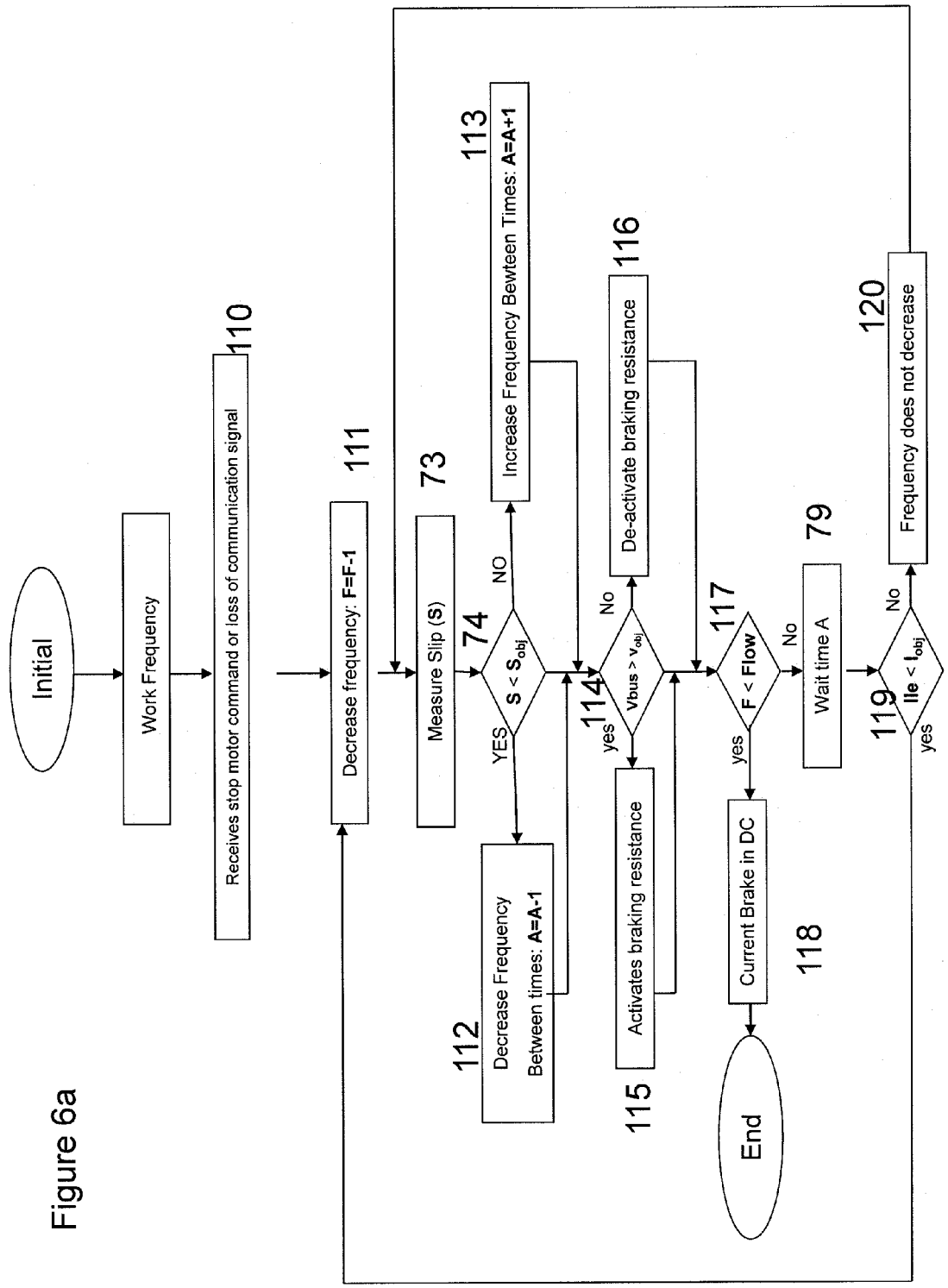
FIG. 6a shows a flow diagram of the control method for the motor braking aspect of the present invention.

FIG. 6a shows the flow diagram of the motor 17 deceleration method aspect of the present invention.

Now considering that said motor 17 is found operating at a given work frequency, it is to be stopped in a safe way, whether it be due to the operational time having lapsed, because for the operation of the machine or system itself to which the present invention is coupled to, for a safety stop, etc. or alas, for whatever the motive may be, a signal is obtained or generated which indicates to the microcontroller 47 that it enters deceleration mode (block 110). In this way, the microcontroller decreases the PWM work frequency F induced into the stator 30 in one determined step (block 111), unit or jump (F−1), the precise range or quantity will depend on the system or machine to which the present invention is mechanically coupled to. Thus, after the microcontroller 47 has reduced the PWM frequency F with which the stator 31 was induced, the slip S is measured (block 73) and compares it to the objective slip Sobj (block 74). If S<Sobj this implies that the slip is lower than the objective, which indicates that the rotor 31 is "following" the magnetic field induced by the stator 31, thus, the time between decreases (A−1) is reduced somewhat, by a jump or time quantity (block 112), since this is a favorable condition and the rotor 30 can be more quickly decelerated. If the opposite is true, when S>Sobj (block 113), this implies the rotor 30 has a slip S greater than desired and thus it is not "following" the magnetic field induced into the stator 31, so that it is convenient to lengthen the time between increases (A+1). Thus, the microcontroller 47 increases somewhat, by a jump or time the amount between decreases (A+1); this is followed by verifying of the slip S, the doubler 43 Vbus is checked (block 114). If said Vbus voltage is greater than the maximum safety voltage which the doubler capacitors can withstand, named Vobj, then the energy is dissipated and this is achieved by activating the braking resistance 55, in this way, the microcontroller 47 sends a signal to the driver 56 of the braking resistance 55 so that it can begin dissipating energy (block 115). If the opposite is true, that is, when Vbus is lower than Vobj, it means that it is unnecessary to dissipate the energy, so that the microcontroller 47 interrupts or turns off the signal to the driver 56 of the braking resistance 55 (block 116). Subsequently, after having verified the voltage Vbus, the microcontroller 47 now checks on the PWM frequency F at which it is operating (block 117), if said frequency F is sufficiently low, for example 10 Hz—Flow–, then in a preferred embodiment of the present invention, the microcontroller 47 can apply a D.C. current brake (block 118) or in another embodiment it can allow the motor's 17 rotor 30 to freely turn until it reaches its resting point, in both cases finalizing with the process of braking the motor 17. If the opposite exists, that is, if F>Flow, then it continues with the braking method and the braking process, followed by the microcontroller 47 initiating a waiting timer and ensuring that the time A (or time interval between increases) lapse (block 79). Once this has lapsed, the current value is read (block 119) emanating from the node related to the shunt resistance 53. If the value of the read resistance "Iread", is greater than the value preprogrammed in the microcontroller 47 for the objective current "Iobj", then the method is returned to block 111, where the PWM frequency F is decreased in part. If the opposite is true, that is, if Ile<Iobj then the frequency will not be decreased (block 120), passing directly to block 73 where the slip S is measured. This cycle is repeated until the F<Flow condition is reached.

Figure 6B:
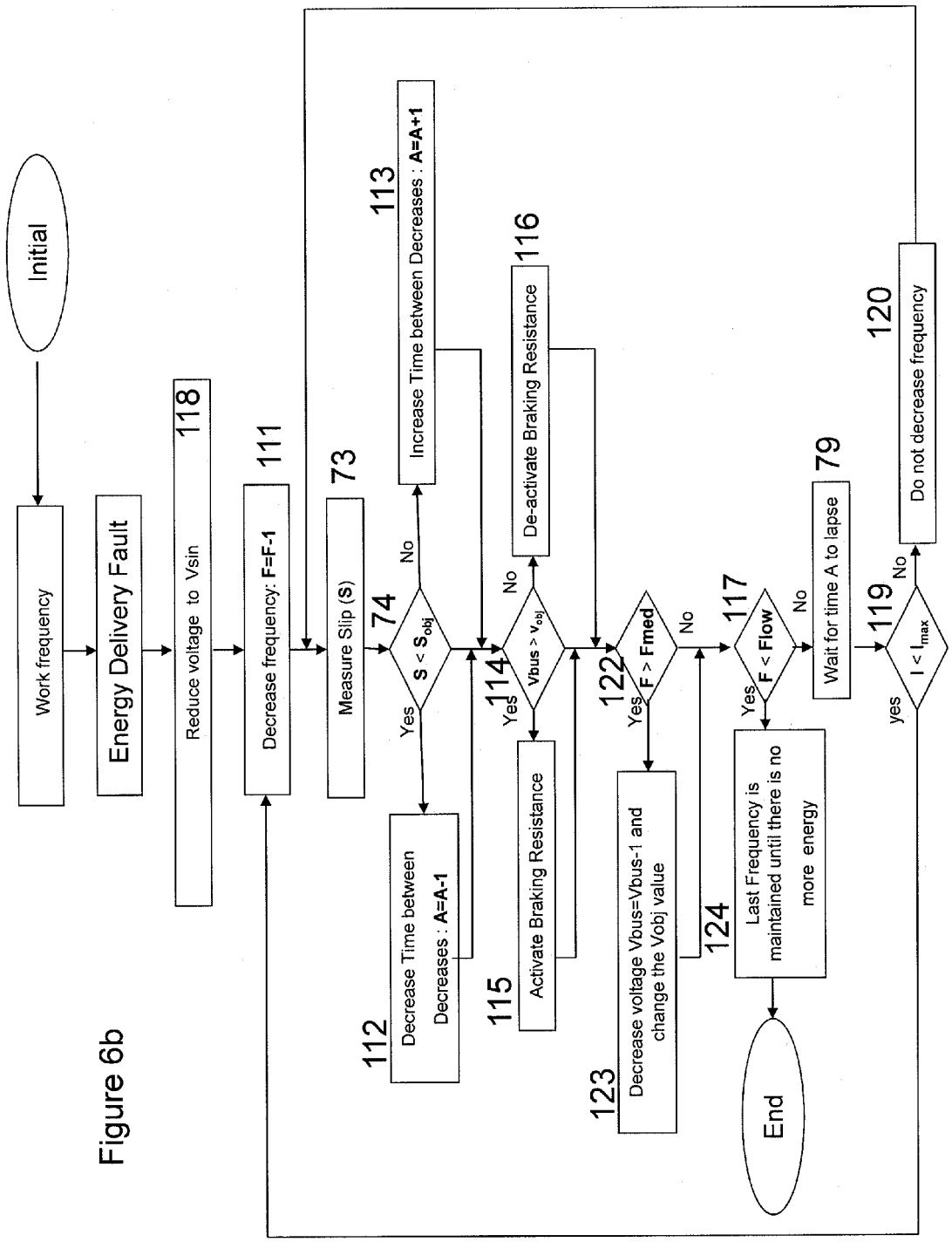
FIG. 6b shows a flow diagram of the control method for the motor braking when a failure in the delivery of electric energy exists, aspect of the present invention.

Control Method for Deceleration or Braking when a Failure in Electric Energy Delivery of the System has Occurred FIG. 6b shows a flow diagram of the braking method of the motor 17 when a failure of energy delivery has occurred, whichever the motive may be as to why the arrangement aspect of the present invention has de-energized or disconnected. Considering now, that said motor 17 is found operating at a given work frequency, it is to be stopped in a safe manner, so that a signal is obtained or generated, this indicates to the microcontroller 47 that it enters a braking mode without supplying energy. In this way, the latter decreases the Vbus voltage (block 118) and thus lowers the Vobj value to a Vsin value (within 20% to 60% lower than the Vobj value). Subsequently, it decreases the PWM work frequency F induced to the stator 30 (block 111) in one determined step, unit or jump (F–1), the precise range or quantity will depend on the system or machine to which the present invention is mechanically coupled to. Now then, after the microcontroller 47 has reduced the PWM frequency F which is induced to the stator 31, it measures the slip S and compares it to an objective slip Sobj (block 74). If S<Sobj it implies that the slip is lower than the objective, which implies the rotor 30 is "following" the magnetic field induced by the stator 31. Thus, the time between decreases (A–1) (block 112) is decreased by a part, jump or quantity, since we are in a favorable condition and the rotor 30 can be more quickly decelerated. If the opposite is true (block 113), when S>Sobj, it means the rotor 30 has a greater slip than desired and thus it is not "following" the magnetic field induced by the stator 31, so that it is convenient to lengthen the time between decreases (A+1). Thus, the microcontroller 47 increases the time between decreases by a part, jump or quantity (A+1). After verifying the slip S, the doubler 43 Vbus is checked (block 114). If said voltage Vbus is greater than the maximum security voltage which the doubler 43 capacitors can withstand, named Vobj, the energy is then dissipated, this is achieved by activating the braking resistance 55 (block 115). In this way, the microcontroller 47 sends a signal to the driver 56 of the braking resistance 55 so that it begins to dissipate energy. If the opposite is true, that is, when Vbus is lower than Vobj, this means that it is unnecessary to dissipate energy, so that the microcontroller 47 interrupts or turns off the signal to the driver 56 of the braking resistance 55 (block 116). Then, after having verified Vbus voltage, the microcontroller 47 now checks on the PWM frequency F at which it is operating, to make a couple of comparisons. In the first comparison (block 122), it compares F to an Fmed frequency (which can, as an example, lie around 150 Hz). If F>Fmed allows it, it proceeds with the next frequency comparison; if the opposite is true, that is, F<Fmed (block 123), then the microcontroller 47 reduces partly the Vbus voltage and changes the value of Vobj. Subsequently, it continues with the following comparison of F; the second F comparison (block 117) which the microcontroller 47 carries out is: F versus Flow, if F<Flow, it allows the rotor 30 of the motor 17 to turn freely until it reaches its resting position (block 124), thus finalizing through this the motor 17 braking process. If the opposite exists, that is, if F>Flow, then it continues with the braking method. The microcontroller 47 initiates a waiting timer and ensures that the time A (or time interval between increases) lapses (block 79). Once this has lapsed, the current value emanating from the node related to shunt resistance 53 is read (block 119), if the value of the current read "Iread" is greater than the value preprogrammed into the microcontroller 47 for objective value "Iobj", then the method is returned to block 111 where the PWM frequency F shall be decreased partly. If the opposite is true, the frequency will not be decreased (block 120), passing directly to block 73 where the slip S is measured. This cycle is repeated until the F<Flow condition is achieved.

It is worth mentioning that in any of the braking methods described above, the option of the microcontroller 47 reading the variables and making determinations "in parallel" or following a "step diagram" structure, which is considered as within the scope of the present invention. Additionally, the order in which the described steps in any of the methods follow an order derived in the best possible manner for the invention to take place which can be seen today, it being evident that the order of the determinations or comparisons or instructions or process blocks can vary without affecting the functionality or scope of the present invention.

Alternative Embodiments of the Present Invention

Figure 7:
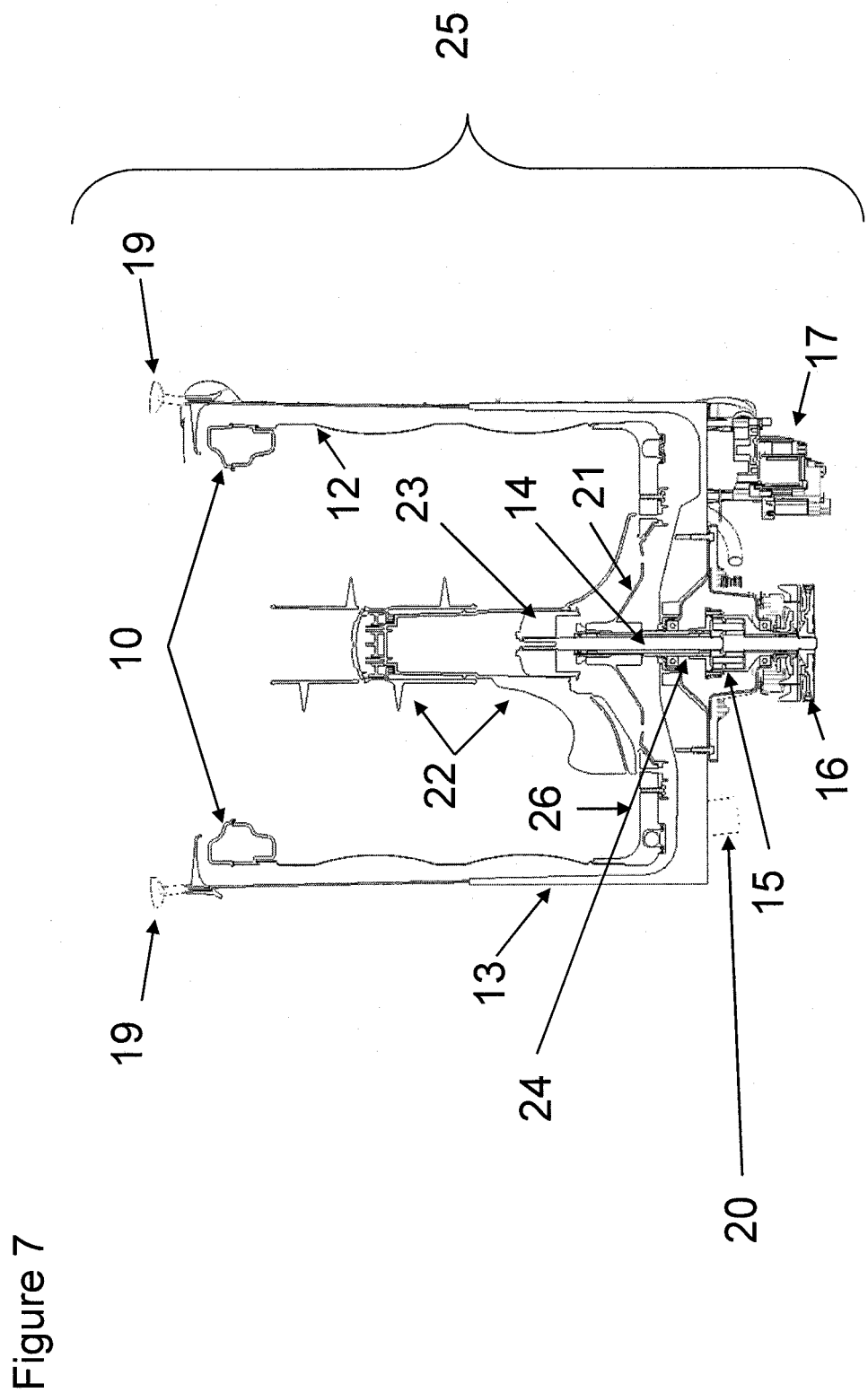
FIG. 7 is a cross section of a washer without a cabinet.

FIG. 7 shows a cross section of a washing machine without a cabinet. This diagram shows the present invention can have a direct application in the field of clothes washers and dryers, so that as an example, but not in a limitative form, a vertical axis washer will be described, even though the method as well as the devices, aspect of the present invention can function in a clothes dryer as well, and can also function in a horizontal axis washer. Thus, a top-loading washer has a basket 12 of a sub-washer 25 mounted within a tub 13. Said basket 12 rotates by means of activating a shaft 14 which is rigidly coupled to the lower part of said basket 12, generally by means of an intermediary link called a hub 21. The shaft 14 can be directly coupled to a motor or induced pulley, in the case of said diagram 1, the shaft 14 is coupled to a planetary reduction gear 15, and this in turn obtains the energy emanating from an induced pulley 16 which obtains energy through a band (not shown) which is energized by an electric motor 17. The basket 12 is composed in its lower part by a basket bottom 26 which has a similar geometry to a disc, which houses the hub 21, to turn in unison with this; the basket 12 also comprises a cylindrical wall which is crowned with the upper balancing ring 10.

The tub 13 in its lower part has some braces, which support the shock absorbers 20 (not shown), from which the rods 19 emanate. The agitator 22 is coupled and supported by the bell 23, which itself is mechanically grasped unto the shaft 14, so that the energy emanating from the motor 17 is transmitted by means of the band (not shown) to the induced pulley 16, and this in turn, in a preferred embodiment moves the planetary reduction gear 15 to decrease its velocity; in a preferred embodiment said planetary reduction gear 15 can be dispensed with, knowing that one of the benign aspects of the motor 17 used in the present invention is that its velocity can be controlled. In this way, the shaft can or not be coupled to a planetary reduction gear 15, where the remaining end of the shaft 14 is grasped to a coupling 23, and this in turn supports and transmits the energy emanating from the shaft 14 towards the agitator 22.

In the centrifuge mode, a clutch (not shown) intervenes which can be a clutch floating between bell 23 and hub 16 or a dented clutch between the induced pulley 16 and the shaft 14. Thus, the shaft runs housed within a cased shaft 24, so that the clutch (whichever it might be) will be charged with clutching or un-clutching the shaft 14 of the cased shaft 24 so that these can turn in unison or in independent manner. So that for the dehydrating mode, the clutch makes both shafts 14 and 24 turn in unison, causing the hub 21 and the perforated basket 12 to turn at the same velocity as the agitator 22, by turning at a velocity such that it makes the centrifugal force upon the objects to be washed be greater than the gravitational force, thus the washing liquid or washing mixture contained in the objects to be washed will have to go to the basket 12 vertical wall, which is provided with cavities which allow for the free flow of water or washing mixture towards the tub 13.

Load Detection Method in the Washer

To detect the load in the washer the same sliding principle is used employing the present invention. Thus, at the beginning of the cycle before the first swat takes place, a fixed frequency F is applied to the stator 31 so that this may generate an electromagnetic field which turns at a determined angular velocity; the agitator mechanically grasped to the rotor 30 of the motor 17 will tend to turn, and after a determined time will reach a constant velocity. After which it reads the slip S in the manner previously described. From a table which contains a load value per each slip with a determined frequency F (preprogrammed in the microcontroller 47), the approximate weight value of the objects to be washed (load) which are set within the basket 12 is obtained. In an alternative embodiment measurement attempts can be made turning the agitator in the opposite direction using the immediately prior measurement gathered to average the values obtained and thus reach a better approximation of the weight value of the objects to be washed (load) which are set within the basket 12.

The detection of the load at the beginning of the cycle allows to determine the water level which is introduced into the tub 13 with the purpose of ensuring the correct washing of the objects set in the basket 12 or even knowing if there is a possible overload of the objects to be washed (load) which are set within the basket 12. This is useful as well to be able to warn the operator or to use a special agitation pattern for overload, thus protecting the elements or components of the washer.

Agitation Method

Figure 8:
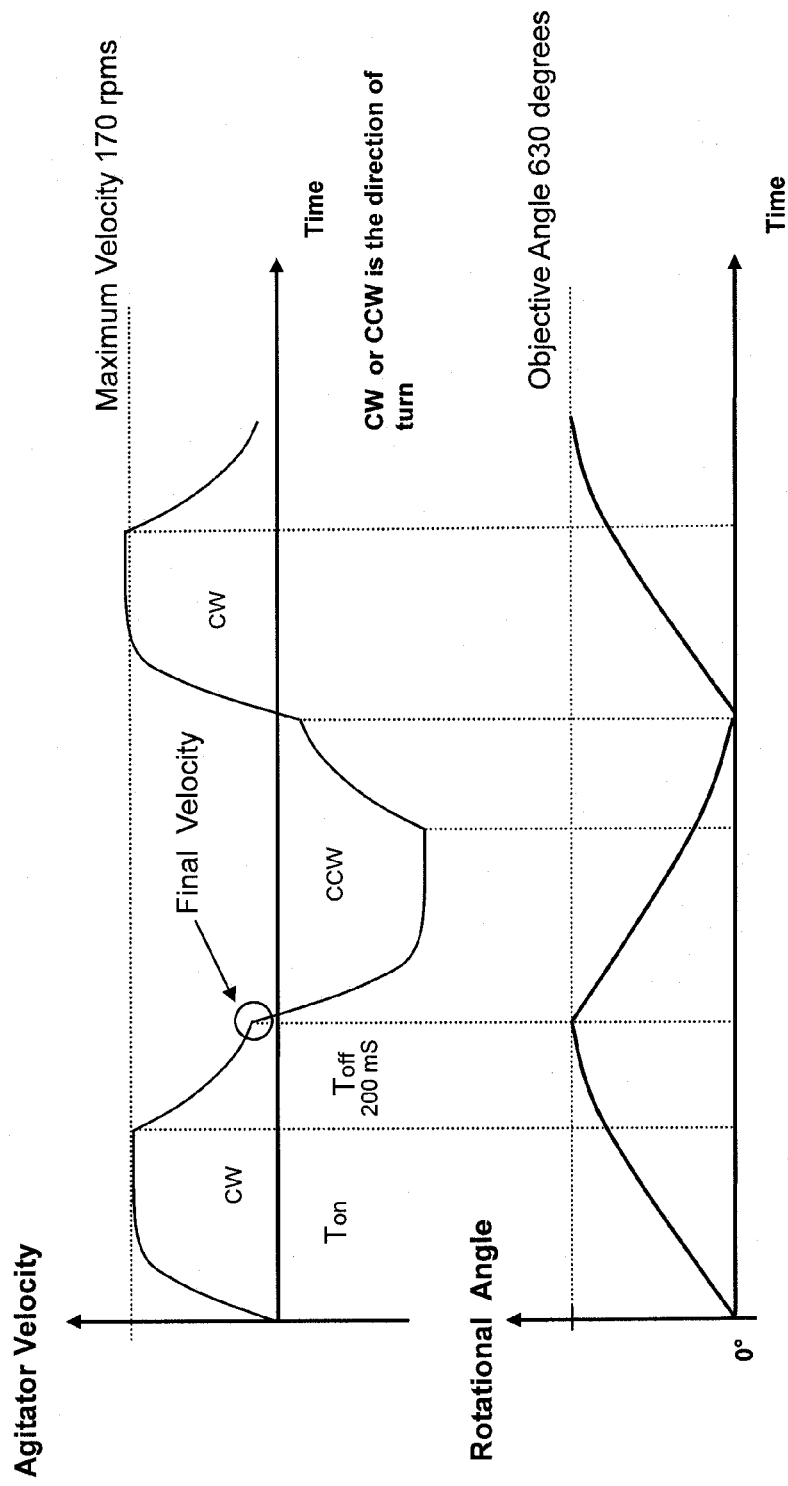
FIG. 8 shows velocity and rotational angle graphs of a washer's agitator.

FIG. 8 shows a pair of graphs which represent the movement which an agitator 22 undergoes within a basket 12. From the upper graph which represents continual swats it can be discerned that the agitator experiments an acceleration until reaching an objective velocity within a certain time (Ton) (energized motor) and later continues its trajectory thanks to inertia or kinetics accumulated in the washing mixture and objects to be washed (motor 17 de-energized (Toff)), so that each Ton makes the agitator rotates at a determined angle plus another angle in Toff which depends on the amount of objects to be washed within the basket 12, the water level in the tub 13, the system's friction, among others. That is, with each Ton the agitator turns until reaching a certain angle within a determined time, if this is not accomplished, it could be indicative of having too much or not much load, as supposing that the agitator goes farther than its objective angle in Ton, this could mean a small load or even working in a vacuum. On the other hand, if the arc which the agitator describes does not reach the objective rotational angle, this could imply an overload or that there exists a problem in the basket 12 such as an entanglement of the clothes or that this has become stuck on one of the washer's elements. These type of problems can be detected by the system proposed in the present invention, knowing that, as the slip S is being constantly monitored it is immediately apparent when an anomaly has occurred, when there is a vacuum condition or an overload, etc., so that then the electric control can send an alert signal, stop the cycle and even select an agitation pattern which would allow it to "disentangle" or "un-stick" the objects to be washed, among other options.

Figure 9:
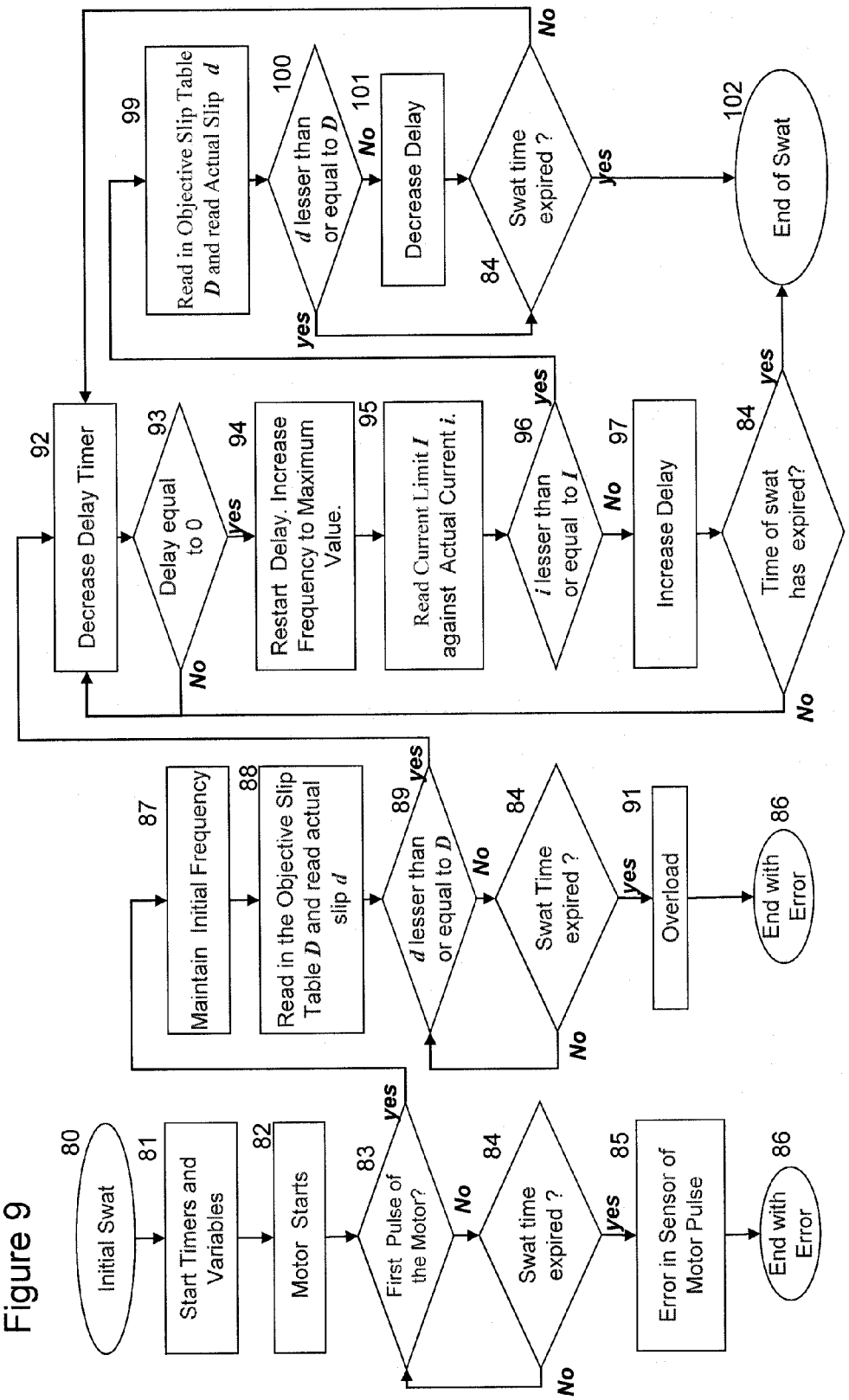
FIG. 9 shows a flow diagram of the agitation method.

FIG. 9 is a flow diagram of an agitation method using the present invention in order to accomplish a swat in a washer in which the motor 17 has been coupled to, the control system and method of the present invention is shown in FIGS. 3, 4a, 4b, 5 which have been fully described. The microcontroller 47 emits an initial frequency F to induce the motor 17 by means of the potential module 44, 48 for a determined time (block 80), in this time lapse the Hall detector 18 signal is awaited to confirm if the rotor 30 has indeed moved (block 83); if a positive signal is not obtained, it is assumed that a clog exists or that the Hall detector 18 is failing, so that the microcontroller 47 makes the determination of sending a fault signal and turning off the system (blocks 85, 86). If the opposite is true, that is, the microcontroller 47 receives a pulse train from the Hall detector 18 which indicates movement of the rotor 30, it then proceeds to obtain a slip S measurement (block 87); if S is greater than Sobj (block 89) and the Ton swat time has lapsed (block 84) then there exists an overload condition or a "clog" (block 91), so that the electronic control can now make the determination of changing the swat parameters to, in this way, continue with the wash process or send a fault signal to the operator and end the cycle (block 86). If the opposite is true, that is, that S be lower than Sobj (block 89), A is decreased (block 92) by one unit until A be equal to zero (block 93). Afterwards, the pre-established values of A are re-initiated, and F is increased by one unit until it reaches its maximum value (block 94). Then the current value emanating from the node related to the resistance shunt 53 is read (block 95); if the value of the current read "Ile" is higher than the value preprogrammed in the microcontroller 47 for the objective current "Iobj" (block 95), then "A" is decreased by one unit (block 97) and it is verified whether Ton has not died (block 84), if this is the case then there is a return to block 92. However, if the opposite is true, that is, if Ton has expired, then that implies that the swat has concluded (block 102). Now if Ile is lower than or equal to Iobj (block 96) then another slip value S measurement is taken (block 99). If S is lower than or equal to Sobj (block 100) and Ton has not died (block 84), then there is a return to block 92. However if the opposite is true, that is, if Ton has expired (block 84), then the swat is finished (block 102). However if S is greater than Sobj (block 100) then A is decreased by one unit (block 101) and if Ton has not expired, then there is a return to block 92; but if the opposite is true, that is, if Ton has expired (block 84) then the swat is finished (block 102).

Method of Centrifuge

Figure 10:
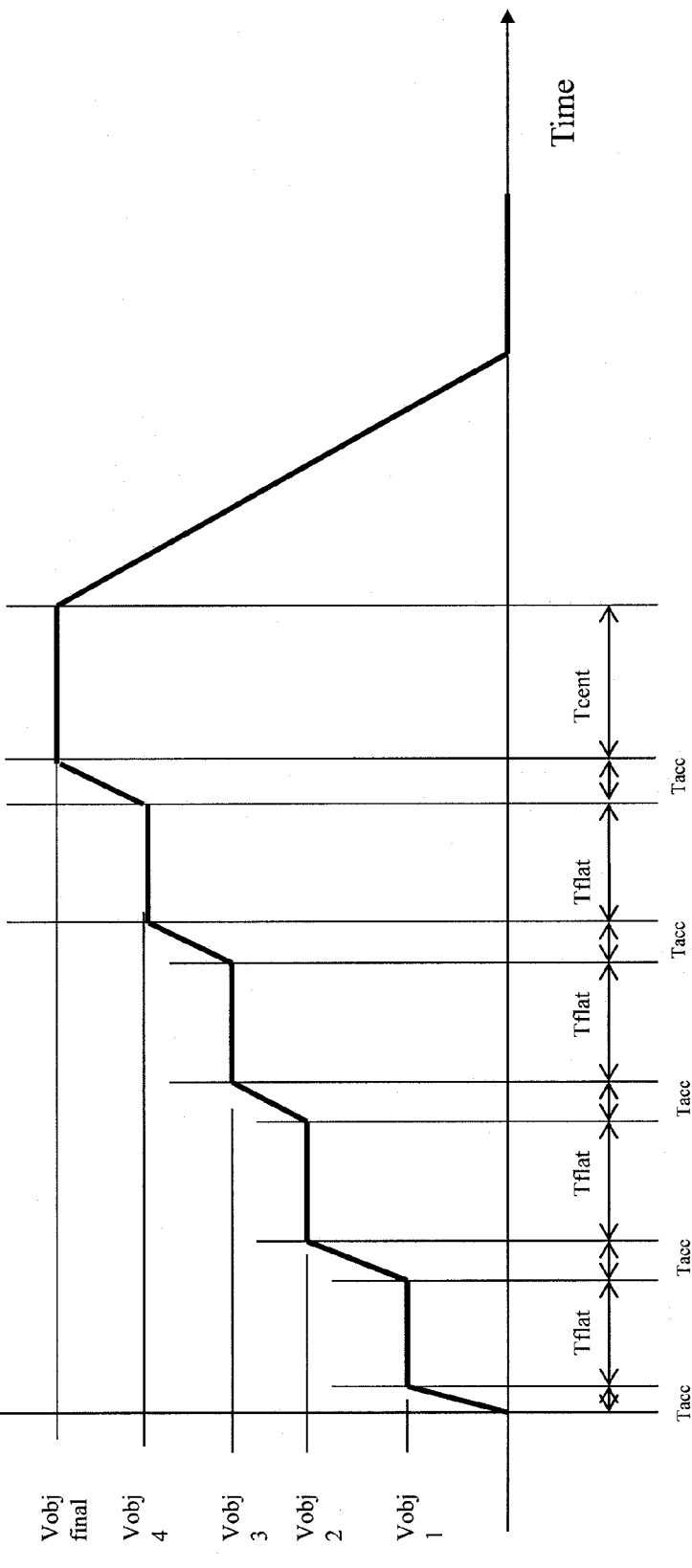
FIG. 10 shows a profile of centrifuge ramps.

In a washing machine the torque requirement for the basket 12 in centrifuge mode decreases as the turn velocity increases: the highest torque occurs at the start to break the inertia of the load set within the basket 12. Once the basket 12 begins acquiring angular velocity the torque is lowered in a directly proportional manner, so that the torque used to keep the basket 12 turning is lower than the torque when the basket 12 was in resting position. However, the torque demand increases again each time the basket's 12 velocity is modified, thus being desirable to use centrifuge ramps such as those shown in FIG. 10, as this avoids the "sudsing" phenomenon caused by a high detergent concentration between the fibers of the objects to be washed set within the basket 12; the extraction of the washing mixture with a high detergent concentration from the objects to be washed between the basket 12 and the tub 13, creates a detergent foam whose surface tension is so high that it generates a strong friction force between the basket 12 and the tub 13 eventually causing clogging of the basket 12; so that in order to accomplish centrifuge in a washing machine to which the motor 17 has been coupled to, the system and method aspect of the present invention and shown in FIGS. 3, 4a, 4b, 5, which have been fully described, the use of centrifuge ramps is preferable. The microcontroller 47 emits an initial frequency F to induce the motor 17 by means of an initial frequency F to induce the motor 17 by means of the potential module 44, 48 for a determined time; the slip S is measured where Sobj is greater given that in a start the slip S is greater to obtain a greater starting torque for the motor 17. Using the method previously described, the microcontroller 44 is programmed with at least one pair of extra objective frequencies "Fobj" to be able to carry out at least one centrifuge ramp, in the centrifuge mode of the washer being described. The microcontroller 44 sends out an initial frequency, with which the potential modules 44, 48 induce energy to the stator 31 which will be increased until reaching a first Fobj, which will be maintained for a determined period of time "Tflat", as this Fobj corresponds to one of the rotor 30 Vobj, which is mechanically coupled to the basket 12 and makes the latter rotate at a determined velocity. Once the Tflat has lapsed, the microcontroller 47 increases again the frequency using the control method previously described, until reaching a second Fobj, which shall correspond to one of the Vobj of the rotor 30. These steps shall be repeated until Fobj be equal to the motor 17 maximum work frequency; upon reaching said maximum frequency it shall be maintained for a determined period of time "Tcent" to later de-energize the motor 17 or to brake it until the rotor 30 reaches its resting state.

In an alternative embodiment of the present invention, Vobj can be attained when the frequency F increments can be made for a determined period of time "Tacc", thus the microcontroller 47 employing the described control method, at the same time in which it begins to increase the frequency F, also starts a timer. The frequency increase shall take place until a determined period of time Tacc has lapsed. Upon this Tacc lapsing, the frequency is maintained for a determined period of time Tflat. These steps are repeated until the frequency F is equal to the motor 17 maximum work frequency. This last maximum frequency shall be maintained for a determined period of time "Tcent" to later de-energize the motor 17 or to brake it until the rotor 30 reaches its resting state.

In both embodiments the microcontroller 47 constantly monitors the slip S in addition to the current associated with the shunt resistance 53. If S or the current are higher than their objective values Sobj or Iobj respectively, this could indicate the presence of sudsing or un-balancing. In which case the microcontroller 47 reduces the frequency F to avoid the motor 17 unnecessarily overheating as well as avoiding undesired forces on the washer components.

Thus having fully described the present invention, it is found to have a high degree of inventive activity, its industrial application being undeniable, at the same time recognizing that an expert in the field could foresee alternative embodiments which shall be included within the scope of the following claims.

The invention claimed is:

1. A system to control an asynchronous tri-phase motor, said system comprising:
   a) a filter coupled to respective Alternative Current (AC) lines to filter line current;
   b) a rectifier coupled to the filter to receive the filtered line current and output a rectified line current;
   c) a voltage multiplier which increases a voltage level of the rectified line current and outputs a Direct Current (DC) voltage;
   d) at least one braking resistance coupled to receive output voltage from the voltage multiplier to dissipate energy when the system is in a braking mode;
   e) at least one resistance shunt effective to measure current which flows in a line from the voltage multiplier to an IGBT module;
   f) a voltage source coupled to adapt the output voltage from the voltage multiplier to energize at least a microcontroller;
   g) a line regulator coupled to the voltage source to remove curls and noise;
   h) the microcontroller configured to process, receive and emit control signals;
   i) a module to emit a pulse train comprising Pulse Width Modulation (PWM) and having a frequency selectively adjusted by the microcontroller, the module operatively coupled to apply the pulse train to an H bridge circuit in the IGBT module;
   j) the IGBT module coupled to pass the output voltage from the voltage multiplier to the tri-phase, asynchronous motor in response to the PWM pulse train applied to the H bridge circuit in the IGBT module;
   k) a retro-feeding line coupled to the microcontroller to measure current; and
   l) at least one pulse detector mechanically coupled to the tri-phase motor to sense rotation information of a rotor of the motor, the pulse detector arranged to supply to the microcontroller a signal or pulse train indicative of the sensed rotation information.

2. The system to control an asynchronous tri-phase motor as recited in claim 1, which further comprises:
   a) a driver controlled by the microcontroller to selectively activate or de-activate the braking resistance.

3. The system to control an asynchronous tri-phase motor as recited in claim 1, which further comprises:
   a) at least one reliever controlled by the microcontroller.

4. The system to control an asynchronous tri-phase motor as recited in claim 1, where the retro-feeding line comprises at least one operational amplifier.

5. The system to control an asynchronous tri-phase motor as recited in claim 1, where the pulse train of the pulse detector is adapted by way of an operational amplifier.

6. A control method for a tri-phase motor which comprises:
   a) generating a train pulse comprising Pulse Width Modulation (PWM) with an initial fixed frequency F;
   b) measuring a slip S between a rotor and a stator;
   c) comparing the slip S versus an objective slip (Sobj);
      i) if S<Sobj, decreasing a time interval A between frequency adjustments;
      ii) increasing the frequency F;
      iii) if S>S obj, increasing the time interval A between frequency adjustments;
   d) comparing a value of time interval A versus a predefined Amax interval value;

i) if A<Amax, increasing frequency F;
ii) if A≧Amax, decreasing frequency F;
e) waiting for time interval A to lapse; and
f) repeating steps b) through j) at least once.

7. A control method to brake a tri-phase motor which operates at a frequency F, which comprises:
a) receiving a stop signal or a signal indicative of loss of communication;
b) decreasing frequency F;
c) measuring a slip S between a rotor and a stator of the motor;
d) comparing the slip S versus an objective slip Sobj;
   i) if S<Sobj, decreasing a time interval A between frequency adjustments;
   ii) if S>Sobj, increasing time interval A;
e) measuring and comparing a bus voltage (Vbus) versus an objective voltage (Vobj);
   i) if Vbus>Vobj, activating a braking resistance;
   ii) if Vbus<Vobj, deactivating the braking resistance;
f) measuring and comparing frequency F versus a predefined low frequency (Flow);
   i) if F<Flow, applying a DC braking signal to the motor;
   ii) if F>Flow, continuing with the method;
g) measuring and comparing a current read (Ile) versus an objective current (Iobj);
   i) if Ile<Iobj, returning to step b);
   ii) if Ile>Iobj, returning to step c); and
h) waiting for time interval A to lapse.

8. A control method to brake a tri-phase motor which operates at a frequency F and which experiences a fault, short or energy shut off, which comprises:
a) receiving an energy fault signal
b) reducing an operational voltage to a predefined value (Vsin);
c) reducing frequency F;
d) measuring an slip S between a rotor and a stator of the motor;
e) comparing slip S versus an objective slip (Sobj);
   i) if S<Sobj, decreasing a time interval A between frequency adjustments;
   ii) if S>Sobj, increasing time interval A;
f) measuring and comparing a bus voltage (Vbus) versus an objective voltage (Vobj);
   i) if Vbus>Vobj, activating a braking resistance;
   ii) if Vbus<Vobj, deactivating the braking resistance;
g) measuring and comparing frequency F versus a frequency Fmed;
   i) if F<Fmed, decreasing Vbus voltage and adjusting a value of Vobj;
   ii) if F>Fmed, continuing with the method;
h) measuring and comparing frequency F to a predefined low frequency (Flow);
   i) if F<Flow, maintaining a last value of frequency F;
   ii) if F>Flow, continuing with the method;
i) measuring and comparing a read current (Ile) versus an objective current (Iobj);
   i) if Ile<Iobj, returning to step c)
   ii) if Ile>Iobj, returning to step d); and
j) waiting for time interval A to lapse.

9. A machine for the treatment of textiles comprising the system of claim 1.

* * * * *